United States Patent
Kim et al.

(10) Patent No.: US 11,409,307 B2
(45) Date of Patent: Aug. 9, 2022

(54) APPARATUS FOR PROVIDING MAP

(71) Applicant: LG Electronics Inc., Seoul (KR)

(72) Inventors: Sungmin Kim, Seoul (KR); Jihyun Kim, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/637,564

(22) PCT Filed: Aug. 8, 2018

(86) PCT No.: PCT/KR2018/009047
§ 371 (c)(1),
(2) Date: Feb. 7, 2020

(87) PCT Pub. No.: WO2019/031852
PCT Pub. Date: Feb. 14, 2019

(65) Prior Publication Data
US 2020/0256681 A1    Aug. 13, 2020

(51) Int. Cl.
*G05D 1/00* (2006.01)
*G06F 16/29* (2019.01)
(Continued)

(52) U.S. Cl.
CPC ......... *G05D 1/0274* (2013.01); *B60W 50/00* (2013.01); *B60W 60/005* (2020.02);
(Continued)

(58) Field of Classification Search
None
See application file for complete search history.

(56) References Cited

U.S. PATENT DOCUMENTS 8,989,053 B1    3/2015    Skaaksrud et al.
9,616,896 B1    4/2017    Letwin et al.
(Continued)

FOREIGN PATENT DOCUMENTS

JP    2002310676    10/2002
JP    2003004468    1/2003
(Continued)

OTHER PUBLICATIONS

Machine Translation of KR-20160140055-A, Noh Dong Gyu et al Dec. 7, 2016 "Automotive Navigation Apparatus and Method for Providing Dynamic Map Thereof" (Year: 2016).*
(Continued)

*Primary Examiner* — James J Lee
*Assistant Examiner* — David Hatch
(74) *Attorney, Agent, or Firm* — Fish & Richardson P.C.

(57) ABSTRACT

A map providing device transmits map data to electric components disposed in a vehicle. The map providing device comprises a communication interface configured to communicate with the electric components and receive a plurality of maps from a plurality of servers and a processor configured to select, from among the plurality of maps, one or more maps based on driving information of the vehicle and control the communication interface to transmit the map data to the electric components, the map data including information of the selected one or more maps.

19 Claims, 19 Drawing Sheets

(51) Int. Cl.
  *G01C 21/32* (2006.01)
  *G05D 1/02* (2020.01)
  *H04W 4/44* (2018.01)
  *B60W 50/00* (2006.01)
  *B60W 60/00* (2020.01)
  *G01C 21/34* (2006.01)

(52) U.S. Cl.
  CPC ......... *B60W 60/0025* (2020.02); *G01C 21/32* (2013.01); *G01C 21/3407* (2013.01); *G05D 1/0044* (2013.01); *G05D 1/0061* (2013.01); *G05D 1/0088* (2013.01); *G05D 1/0231* (2013.01); *G06F 16/29* (2019.01); *H04W 4/44* (2018.02); *B60W 2556/45* (2020.02)

(56) References Cited

U.S. PATENT DOCUMENTS

| | | | |
|---|---|---|---|
| 9,818,238 | B2 | 11/2017 | Hiroki |
| 10,564,638 | B1 | 2/2020 | Lockwood et al. |
| 10,642,279 | B2 | 5/2020 | Lockwood |
| 2009/0281717 | A1 | 11/2009 | Nambata |
| 2010/0153007 | A1 | 6/2010 | Crowley |
| 2013/0147405 | A1 | 6/2013 | Yoon |
| 2016/0052516 | A1 | 2/2016 | Kim et al. |
| 2016/0275131 | A1 | 9/2016 | Lublinsky et al. |
| 2017/0285632 | A1 | 10/2017 | Bostick et al. |
| 2018/0003512 | A1* | 1/2018 | Lynch .................. G01C 21/32 |
| 2018/0023964 | A1 | 1/2018 | Ivanov et al. |
| 2018/0087917 | A1* | 3/2018 | Adachi ............ G01C 21/3691 |
| 2018/0126976 | A1 | 5/2018 | Naserian et al. |
| 2018/0202814 | A1 | 7/2018 | Kudrynski et al. |
| 2018/0284260 | A1 | 10/2018 | Oyaizu et al. |

FOREIGN PATENT DOCUMENTS

| | | |
|---|---|---|
| JP | 2004198997 | 7/2004 |
| JP | 2007003568 | 1/2007 |
| JP | 2007121139 | 5/2007 |
| JP | 2014092470 | 5/2014 |
| JP | 2016133386 | 7/2016 |
| JP | 2016143324 | 8/2016 |
| KR | 20120079625 | 7/2012 |
| KR | 20150060953 | 6/2015 |
| KR | 20160128077 | 11/2016 |
| KR | 20170082165 | 7/2017 |
| KR | 20170082674 | 7/2017 |
| WO | WO2017165627 | 9/2017 |

OTHER PUBLICATIONS

International Search Report and Written Opinion in International Appln. No. PCT/KR2018/009046, dated Nov. 20, 2018, 28 pages (with English translation).

International Search Report and Written Opinion in International Appln. No. PCT/KR2018/009048, dated Nov. 6, 2018, 26pages (with English translation).

Non-Final Office Action in U.S. Appl. No. 16/637,598, dated Feb. 17, 2022, 22 pages.

Office Action in U.S. Appl. No. 16/637,218, dated Mar. 17, 2022, 33 pages.

* cited by examiner

[ V2X-LDM ]

[ eHorizon-ADASIS ]

(a)

(b)

APPARATUS FOR PROVIDING MAP

CROSS-REFERENCE TO RELATED APPLICATIONS

This application is a National Stage application under 35 U.S.C. § 371 of International Application No. PCT/KR2018/009047, filed on Aug. 8, 2018, the disclosure of which is incorporated by reference in its entirety.

TECHNICAL FIELD

The present disclosure relates to a map providing device, and more particularly, to a map providing device mounted in a vehicle to provide map data to a plurality of electric components provided in the vehicle.

BACKGROUND

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

Meanwhile, as development of an advanced driving assist system (ADAS) is actively undergoing in recent time, necessity to develop a technology for optimizing user's convenience and safety while driving a vehicle is emerged.

As part of this effort, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assist System Interface Specification (ADASIS (ADAS)."

eHorizon, which provides map data to a plurality of electric components provided in a vehicle, is becoming an essential element for autonomous driving.

On the other hand, there are many companies that provide maps constructing eHorizon, and such maps provided by the respective companies are not exactly the same. An infrastructure for autonomous driving is configured by various applications and various providers. Each provider has its own data processing scheme, and thereby accuracy and precision of location information (or map) used by each provider are different.

SUMMARY

The present disclosure is directed to solving the aforementioned problems and other drawbacks.

One aspect of the present disclosure is to provide a map providing device, capable of matching location information even when using applications provided by various providers.

The present disclosure relates to a map providing device mounted in a vehicle to provide map data to a plurality of electric components disposed in the vehicle.

The map providing device may include a communication interface configured to communicate with the electric components and receive a plurality of maps from a plurality of servers and a processor configured to select, from among the plurality of maps, one or more maps based on driving information of the vehicle and control the communication interface to transmit the map data to the electric components, the map data including information of the selected one or more maps.

According to one embodiment, the plurality of servers including a first server and a second server, and wherein the processor is configured to based on the vehicle being in a first state, transmit a first map to the electric components, the first map being received from the first server and based on the vehicle being in a second state, transmit a second map to the electric components, the second map being received from the second server.

According to one embodiment, the processor is configured to, based on the vehicle being in the second state, transmit the first map and the second map to the electric components.

According to one embodiment, the processor is configured to, based on the vehicle being switched from the second state to the first state, terminate the transmission of the second map.

According to one embodiment, the processor is configured to, based on the vehicle being switched from the first state to the second state, match first reference points or first reference axes of the first map with second reference points or second reference axes of the second map to align the first map with the second map.

According to one embodiment, the processor is configured to align the first map with the second map in real time based on a location of the vehicle.

According to one embodiment, the processor is configured to calculate a time required for aligning the first map with the second map, and control the communication interface to transmit the required time to the electric components.

According to one embodiment, the processor is configured to adjust a driving speed of the vehicle according to the required time.

According to one embodiment, the processor is configured to, based on the driving information satisfying a preset condition in the first state, temporarily transmit the first map and the second map to the electric components.

According to one embodiment, the processor is configured to, based on the driving information failing to satisfy the preset condition, continuously transmit the first map to the electric components and cease transmission of the second map to the electric components.

According to one embodiment, the first state is a manual driving state of the vehicle and the second state is an autonomous driving state of the vehicle.

According to one embodiment, the driving information is electric component information received from at least one of the electric components, and wherein the processor is configured to determine whether the preset condition is satisfied based on the electric component information.

According to one embodiment, the driving information satisfies the preset condition in the first state based on at least one of a determination that, in the manual driving state, a turn signal is turned on, a detection, in the manual driving state, of an object with a potential for collision that is higher than a reference value, a determination that, in the manual driving state, a predetermined distance remains until the vehicle enters an intersection, or a determination that, in the manual driving state, the vehicle intrudes into a lane departure.

According to one embodiment, the second map includes a plurality of layers, wherein the processor is configured to, based on the driving information, select, from among the plurality of layers, one or more layers included in the second map, and transmit the one or more layers to the electric components, and wherein the processor is configured to withhold transmission of one or more unselected layers among the plurality of layers to the electric components.

According to one embodiment, the second map includes a plurality of dynamic objects detectable by at least one of the electric components, wherein the processor is configured to, based on the driving information, select, from among the plurality of dynamic objects included in the second map, one or more dynamic objects, and transmit the selected one or more dynamic objects to the electric components, and wherein the processor is configured to withhold transmission of one or more unselected dynamic objects among the plurality of dynamic objects to the electric components.

According to one embodiment, the first map is a standard definition map and the second map is a high definition map.

According to one embodiment, the plurality of servers include a first server and a second server and wherein the processor is configured to transmit a first map to at least one of the electric components, the first map received from the first server, based on transmitting the first map to the at least one of the electric components, receive, from the at least one of the electric components, a request message that requests a specific map and transmit, in response to the request message, a second map to the electric components, the second map received from the second server.

According to one embodiment, the processor is configured to receive a first map from a first server and a second map from a second server, and wherein the processor is configured to, based on a destination being input to the vehicle determine, from the first map, a first path from a location of the vehicle to the destination, determine, from the second map, a second path from the location of the vehicle to the destination and match the first path with the second path.

According to one embodiment, the map providing device further comprises a memory, wherein the processor is configured to identify one or more nodes for matching the first path with the second path, and store the one or more nodes in the memory.

According to one embodiment, the one or more nodes include a first node for a first section and a second node for a second section, and wherein the processor is configured to based on the vehicle being located in the first section, match the first path with the second path using the first node and based on the vehicle being located in the second section, match the first path with the second path using the second node.

Advantages of the Disclosure

Hereinafter, advantages of a vehicle control device and a map providing device having the same according to the present disclosure will be described.

A map providing device according to the present disclosure provides map data to electric components disposed in a vehicle. At this time, since map data received from a server is not all transmitted but is selectively provided based on driving information of a vehicle, computation that the electric components should perform can be reduced. Furthermore, the map providing device provides the map data through a cache memory. Since an amount of the map data is drastically reduced, a lifespan of the cache memory can be extended.

The map providing device according to the present disclosure can temporarily provide map data as much as being required for performing autonomous driving to the electric components, if necessary, even when the vehicle is in a manual driving state, thereby improving accuracy of safety functions for persons on board the vehicle.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
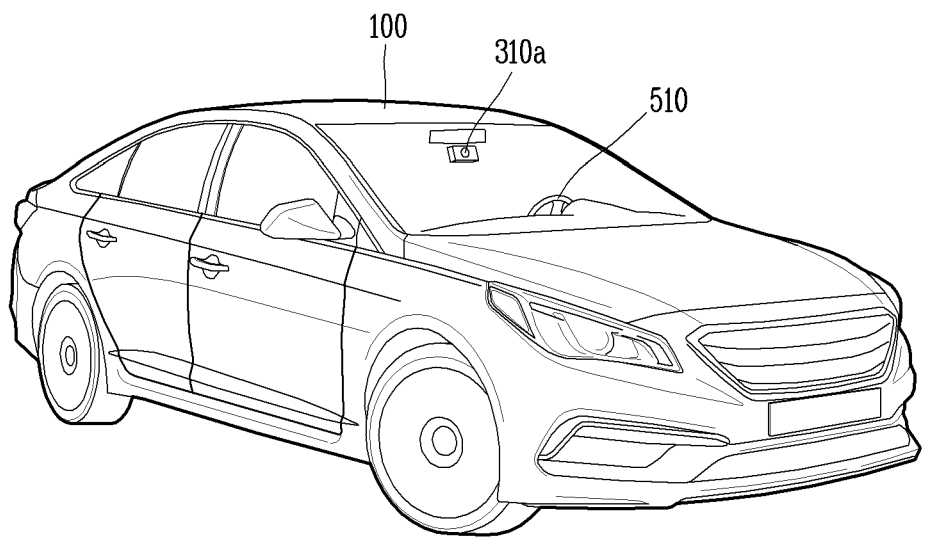
FIG. 1 is a view illustrating appearance of a vehicle in accordance with an embodiment of the present disclosure.
Figure 1:
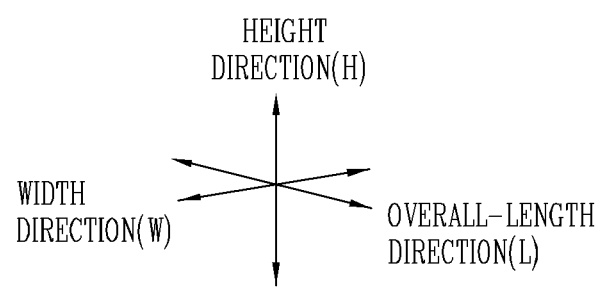

FIG. 1 is a view illustrating appearance of a vehicle in accordance with an embodiment of the present disclosure.

Figure 2:
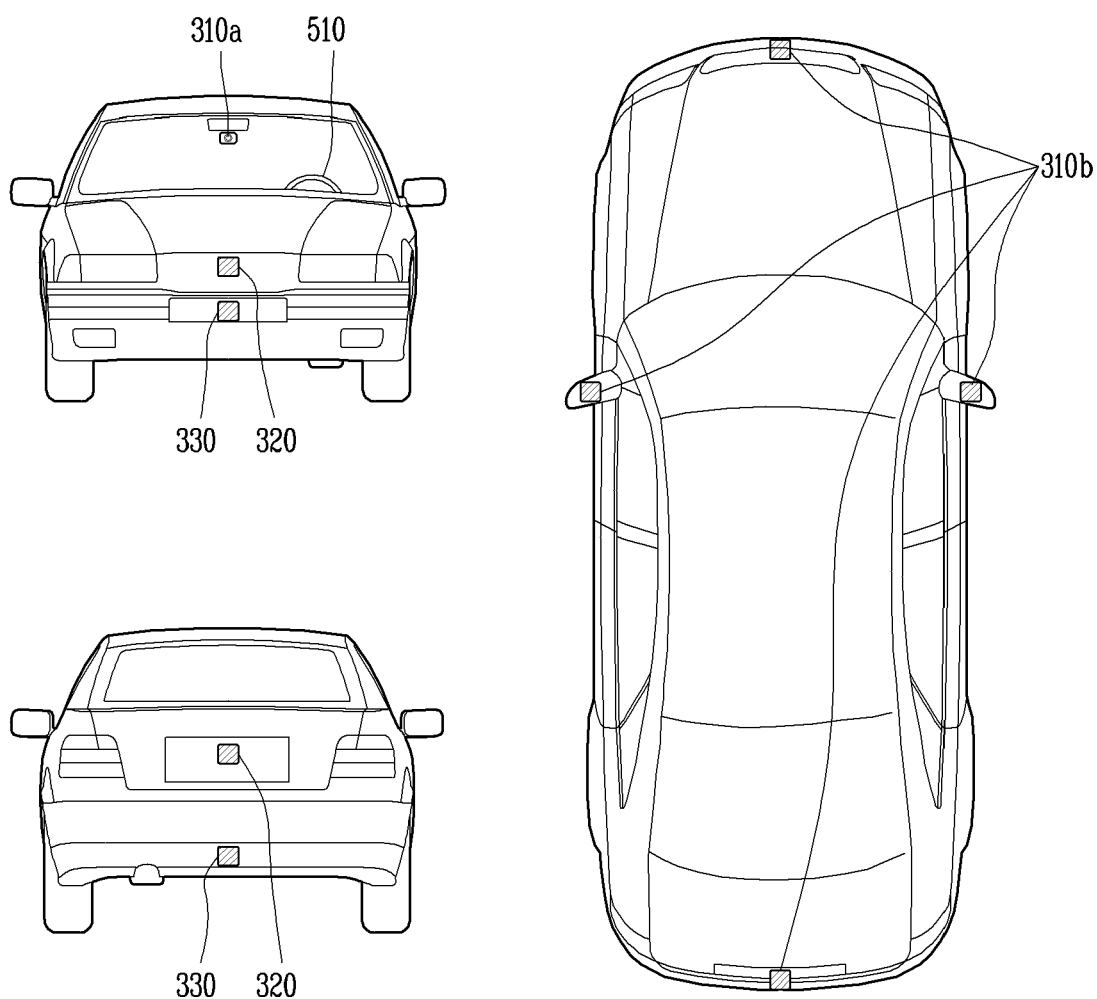
FIG. 2 is a view illustrating appearance of a vehicle at various angles in accordance with an embodiment of the present disclosure.

FIG. 2 is a view illustrating appearance of a vehicle at various angles in accordance with an embodiment of the present disclosure.

Figure 3:
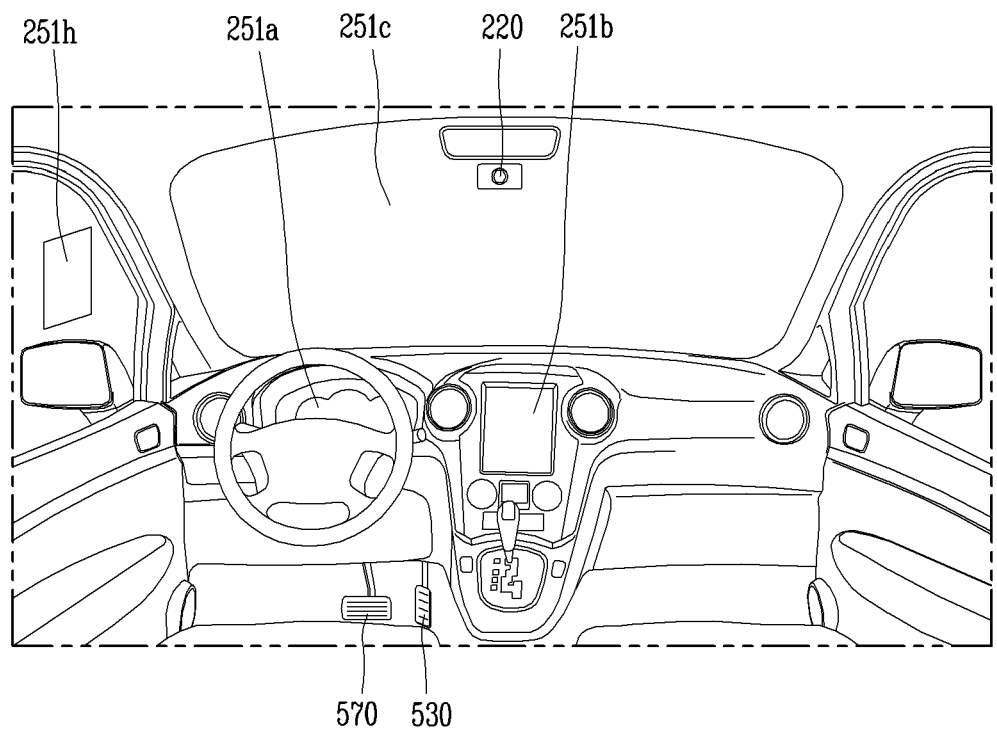
FIGS. 3 and 4 are views illustrating an inside of a vehicle in accordance with an embodiment of the present disclosure.
Figure 4:
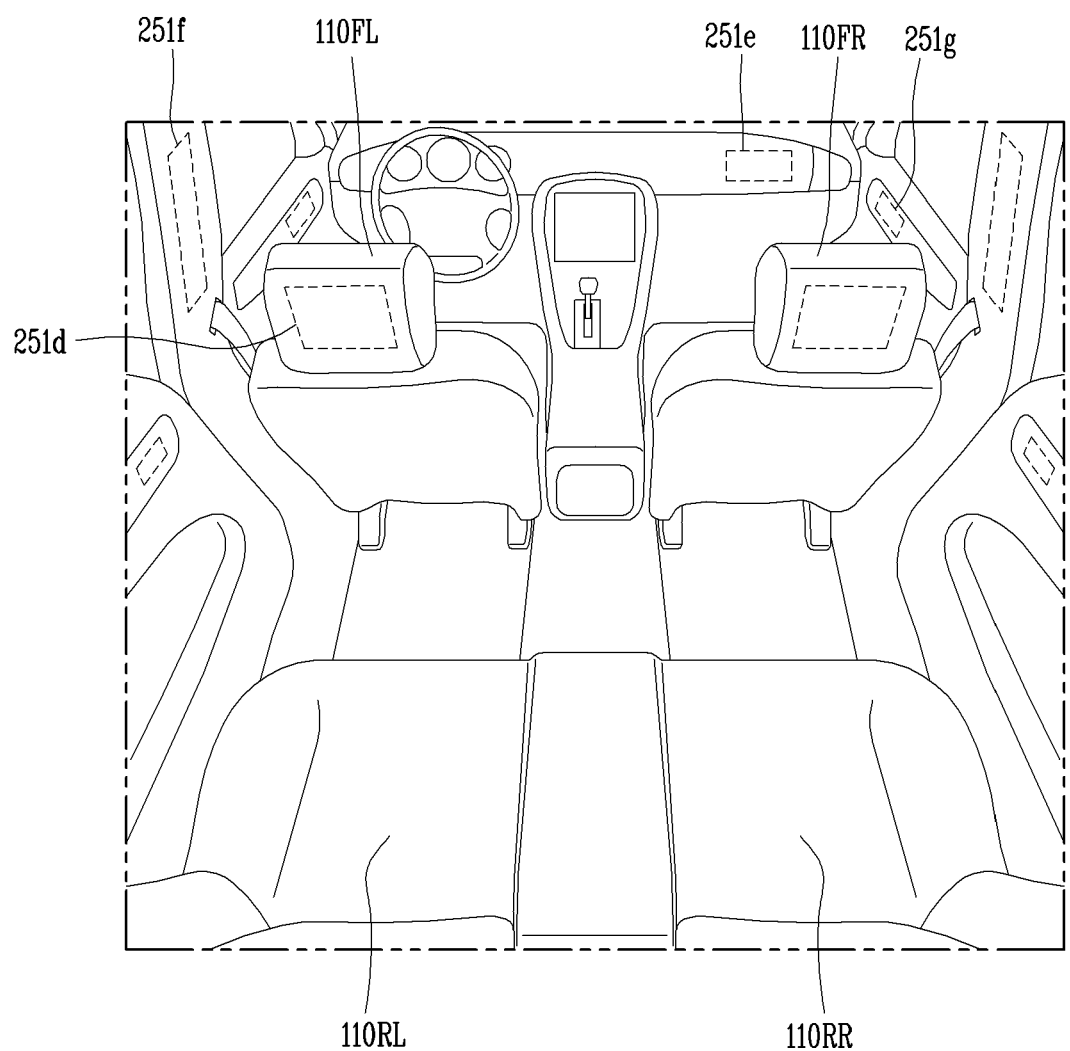

FIGS. 3 and 4 are views illustrating an inside of a vehicle in accordance with an embodiment of the present disclosure.

Figure 5:
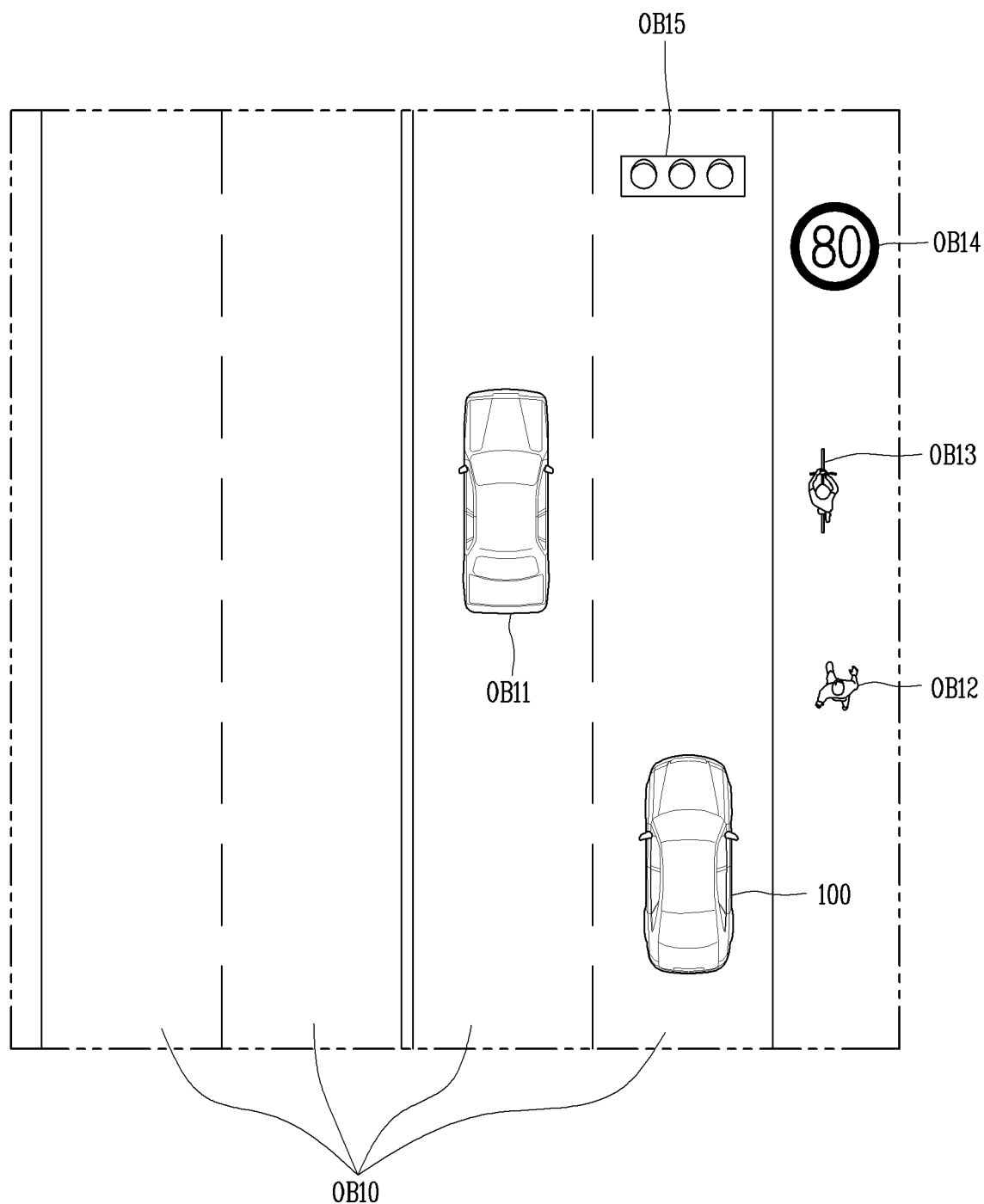
FIGS. 5 and 6 are reference views illustrating objects in accordance with an embodiment of the present disclosure.
Figure 6:
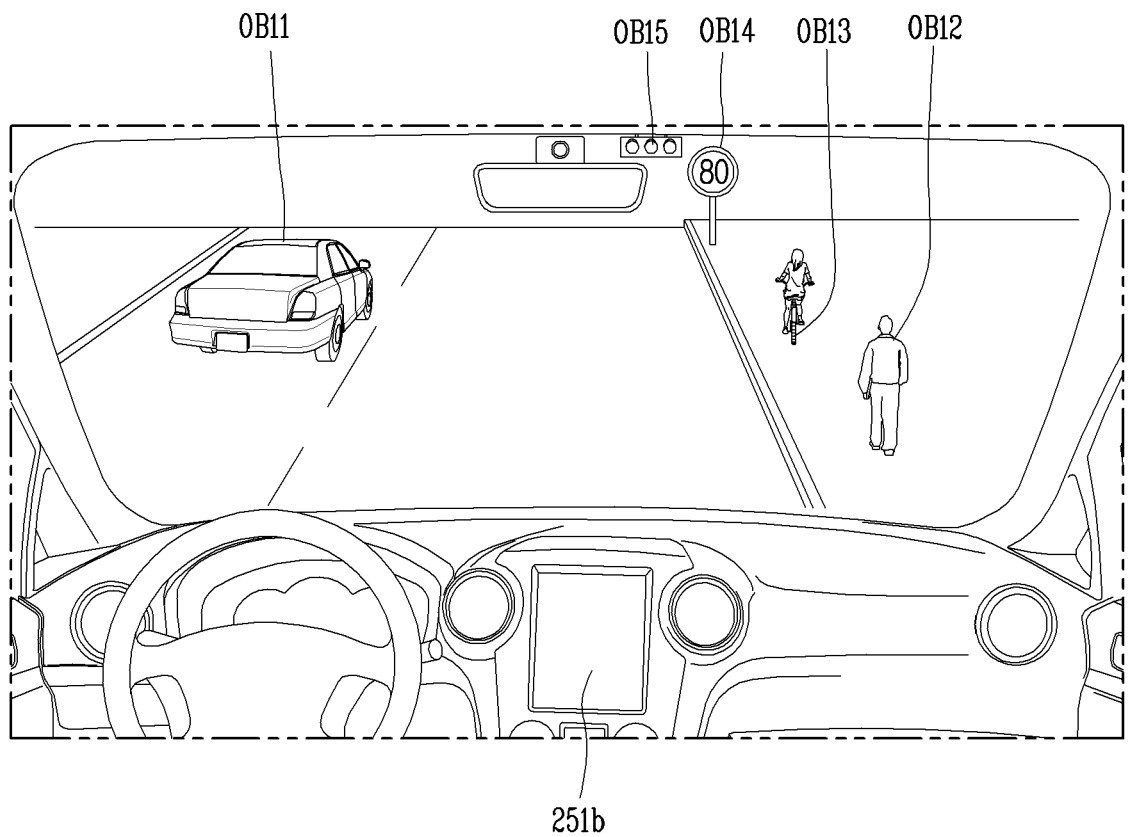

FIGS. 5 and 6 are reference views illustrating objects in accordance with an embodiment of the present disclosure.

Figure 7:
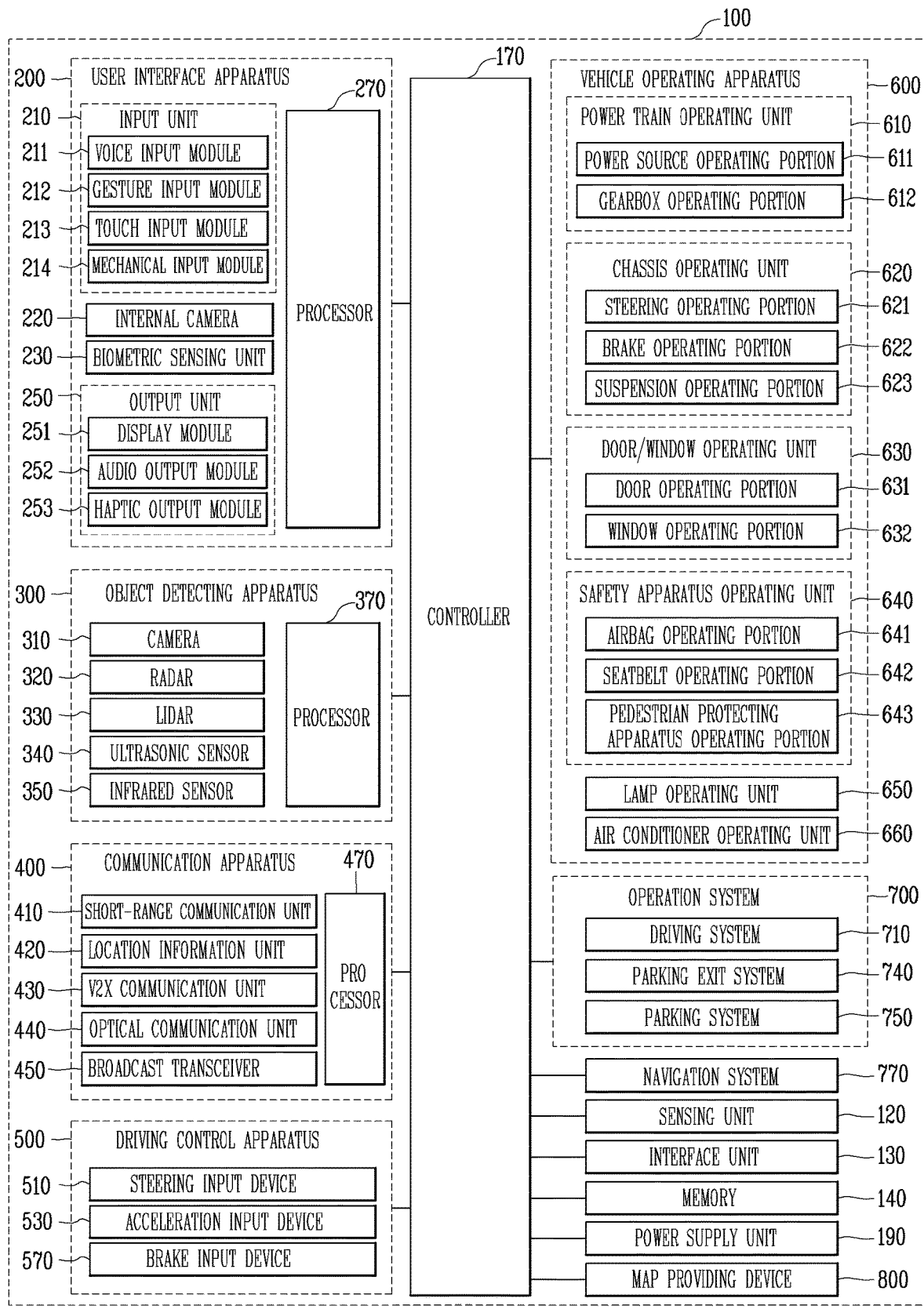
FIG. 7 is a block diagram illustrating a vehicle in accordance with an embodiment of the present disclosure.

FIG. 7 is a block diagram illustrating a vehicle in accordance with an embodiment of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 includes an audio input module 211, a gesture input module 212, a touch input module 213, and ma mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch.

An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed at an appropriate position outside the vehicle to detect an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

On the other hand, according to an embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control the operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, description will be given in more detail of a method of autonomously driving a vehicle related to the present disclosure in an optimized manner or outputting warning messages related to driving of the vehicle in an optimized state, with reference to the accompanying drawings.

Figure 8:
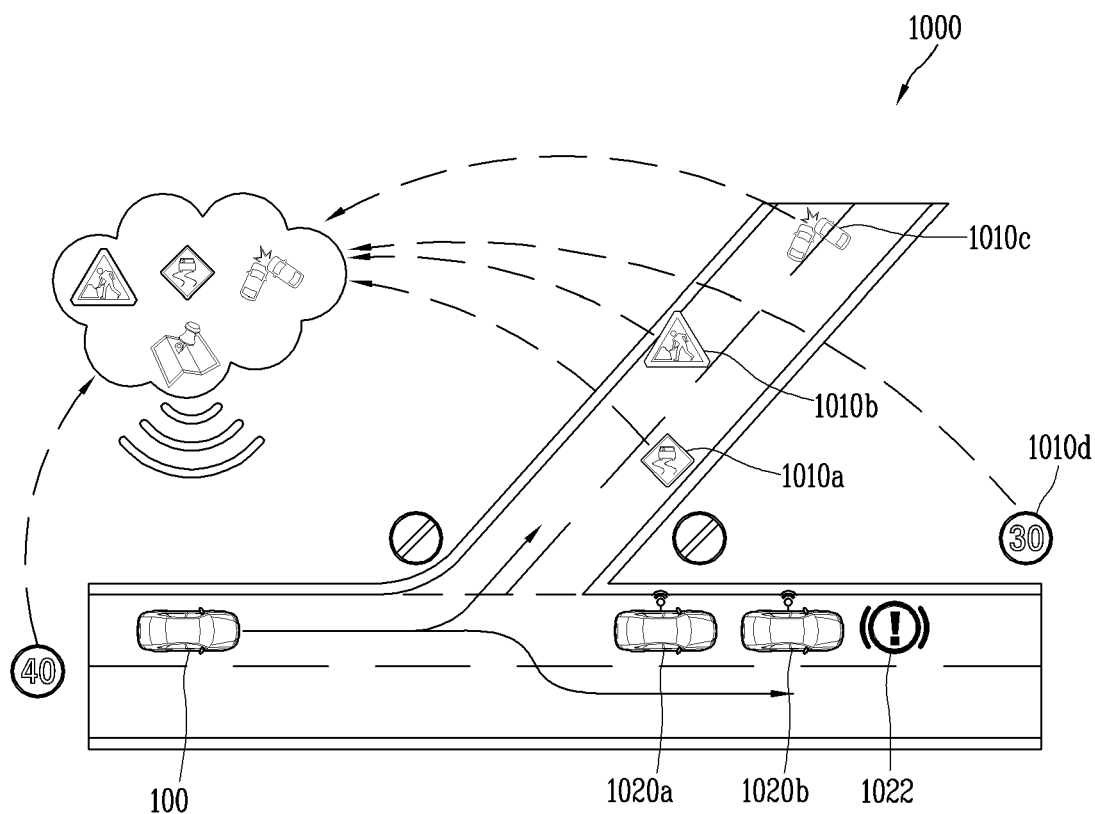
FIG. 8 is a conceptual view illustrating an eHorizon in accordance with the present disclosure.

FIG. 8 is a conceptual view illustrating an eHorizon in accordance with the present disclosure.

Referring to FIG. 8, a map providing device 800 according to the present disclosure may autonomously drive the vehicle 100 on the basis of eHorizon.

eHorizon may be classified into categories such as software, system, concept, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems.

For an example, eHorizon may refer to an external server (a cloud or a cloud server).

In other words, eHorizon may play the role of transferring a detailed map road shape and real time events in front of the vehicle to autonomous driving systems and infotainment systems under an external server/V2X environment.

In order to transfer eHorizon data (information) transmitted from the eHorizon (i.e., external server) to autonomous driving systems and infotainment systems, a data specification and transmission method may be formed in accordance with a standard called "Advanced Driver Assistance Systems Interface Specification (ADASIS)."

The map providing device 800 associated with the present disclosure may use information received from eHorizon for autonomous driving systems and/or infotainment systems.

For example, autonomous navigation systems may be divided into safety aspects and ECO aspects.

In terms of the safety aspect, the map providing device 800 according to the present disclosure may perform an ADAS function such as Lane Keeping Assist (LKA), Traffic Jam Assist (TJA) or the like, and/or an AutoDrive (AD) function such as advance, road joining, lane change or the like using road shape information and event information received from eHorizon and surrounding object information sensed through the sensing unit 840 provided in the vehicle.

Furthermore, in terms of the ECO aspect, the map providing device 800 may receive inclination information, traffic light information, and the like on a front road from eHorizon to control the vehicle so as to achieve efficient engine thrust, thereby enhancing fuel efficiency.

The infotainment system may include convenience aspects.

For an example, the map providing device 800 may receive accident information, road surface condition information, and the like on a front road from eHorizon to output them on a display unit (for example, HUD (Head Up Display), CID, Cluster, etc.) provided in the vehicle, so as to provide guidance information for allowing the driver to perform safe driving.

Referring to FIG. 8, the eHorizon (external server) may receive location information and/or road-specific speed limit information 1010d related to various event information (for example, road surface state information 1010a, construction information 1010b, accident information 1010c, etc.), which have been generated on the road, from the vehicle 100 or other vehicles 1020a, 1020b or collect them from infrastructures (for example, a measuring device, a sensing device, a camera, etc.) installed on the road.

In addition, the event information and the road-specific speed limit information may be linked to map information or may be updated.

In addition, the location information related to the event information may be divided into lane units.

By using such information, the eHorizon (external server) of the present disclosure can provide information necessary for an autonomous driving system and an infotainment system to each vehicle based on a detailed map capable of determining a road situation (or road information) in the lane unit.

In other words, the eHorizon (external server) of the present disclosure may provide an absolute highly-detailed map using an absolute coordinate of road-related information (for example, event information, location information of the vehicle 100, etc.) based on a detailed map.

The road-related information provided by the eHorizon may be information corresponding to a predetermined region (predetermined space) with respect to the vehicle 100.

On the other hand, the map providing device 800 of the present disclosure may acquire location information related to another vehicle through communication with the another vehicle. Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control device (or ITS station) including information associated with a safe and normal operation of an application (or application program) provided in a vehicle (or ITS (Intelligent Transport System)). The LDM may, for example, comply with EN standards.

The LDM differs from the foregoing ADAS MAP in the data format and transmission method. For an example, the ADAS MAP may correspond to a highly detailed MAP having an absolute coordinate received from the eHorizon (external server), and the LDM may denote a highly detailed MAP having relative coordinates based on data transmitted and received through V2X communication.

The LDM data (or LDM information) denotes data mutually transmitted and received in V2X communication (vehicle to everything) (for example, V2V (Vehicle to Vehicle) communication, V2I (Vehicle to Infra) communication, V2P (Vehicle to Pedestrian) communication).

The LDM is a concept of a storage for storing data transmitted and received in V2X communication, and the LDM may be formed (stored) in a vehicle control device provided in each vehicle.

The LDM data may denote data exchanged between a vehicle and a vehicle (infrastructure, pedestrian) or the like, for an example. The LDM data may include a Basic Safety Message (BSM), a Cooperative Awareness Message (CAM), and a Decentralized Environmental Notification message (DENM), for an example.

The LDM data may be referred to as a V2X message or an LDM message, for an example.

The vehicle control device associated with the present disclosure may efficiently manage LDM data (or V2X messages) efficiently transmitted and received between vehicles using the LDM.

Based on LDM data received via V2X communication, the LDM may store, distribute to another vehicle, and continuously update all relevant information (for example, a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For an example, a V2X application provided in the map providing device 800 registers with the LDM, and receives a specific message such as all the DENMs in addition to a warning about a failed vehicle. Then, the LDM may automatically assign the received information to the V2X application, and the V2X application may control the vehicle based on the information assigned from the LDM.

As described above, the vehicle of the present disclosure may control the vehicle using the LDM formed by the LDM data collected through V2X communication.

The LDM associated with the present disclosure may provide road-related information to the vehicle control device. The road-related information provided by the LDM provides only a relative distance and a relative speed with respect to another vehicle (or an event generation point), other than map information having absolute coordinates.

In other words, the vehicle of the present disclosure may construct autonomous driving using an ADAS MAP (absolute coordinate highly-detailed MAP) according to the ADASIS standard provided by eHorizon, but it may be used only to determine a road condition in a surrounding area of the vehicle.

In addition, the vehicle of the present disclosure may construct autonomous driving using an LDM (relative coordinate highly-detailed MAP) formed by LDM data received through V2X communication, but there is a limitation in that accuracy is inferior due to insufficient absolute location information.

The vehicle control device included in the vehicle of the present disclosure may generate a merged detailed map using an ADAS MAP received from eHorizon and LDM data received through V2X communication, and control (autonomously drive) the vehicle in an optimized manner using the merged detailed map.

Hereinafter, a vehicle control device capable of generating a merged detailed map will be described in more detail with reference to the accompanying drawings.

Figure 9:
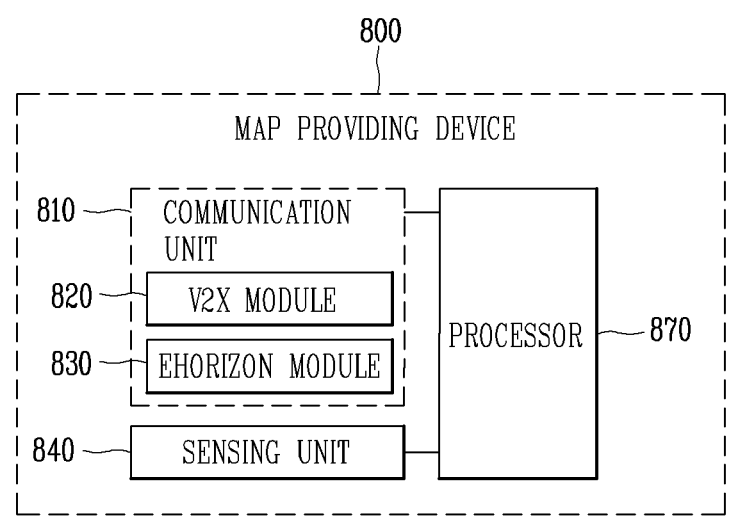
FIG. 9 is a conceptual view illustrating a map providing device in accordance with one embodiment of the present disclosure.
Figure 10A:
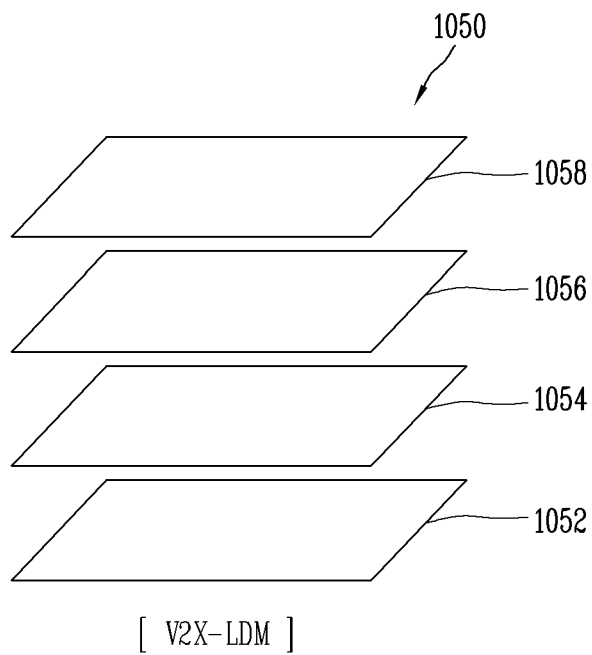
FIGS. 10A and 10B are conceptual views illustrating a Local Dynamic Map (LDM) and an Advanced Driver Assistance System (ADAS) MAP according to the present disclosure.
Figure 10B:
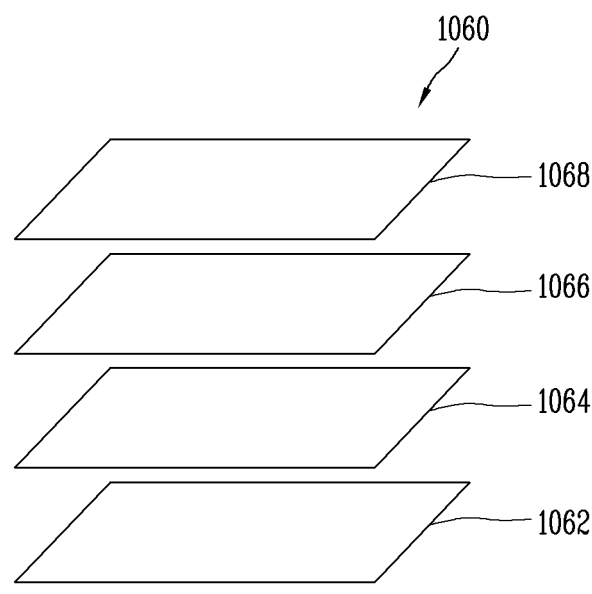

FIG. 9 is a conceptual view illustrating a vehicle control device in accordance with one embodiment of the present disclosure. FIGS. 10A and 10B are conceptual views illustrating a Local Dynamic Map (LDM) and an Advanced Driver Assistance System (ADAS) MAP according to the present disclosure.

As illustrated in FIG. 9, the vehicle control device 800 according to the present disclosure may include a communication unit 810, a sensing unit 840, a display unit 840, a processor 870 and the like.

The communication unit 810 may be the communication device 400 described above.

In addition, the communication unit 810 associated with the present disclosure may determine a current location of the vehicle through the location information unit 420. Furthermore, the communication unit 810 may perform communication with a surrounding vehicle (or another vehicle) or perform communication with an external server (eHorizon or cloud server).

In other words, the communication unit 810 associated with the present disclosure may be configured to acquire location information of the vehicle, and perform communication with at least one of an external server and another vehicle.

As shown in FIG. 9, the communication unit 810 may include a V2X module 820 and an eHorizon module 830.

The V2X module 820 may perform communication with another vehicle. That is, the communication unit 810 may perform communication with a nearby vehicle (or another vehicle). This may be referred to as Vehicle to everything (V2V) communication. V2X communication may be generally defined as a technology for exchanging information with vehicles, and sharing information related to location, speed and the like of a nearby vehicle.

Further, the communication unit 810 may perform communication with all of the devices (for example, a mobile terminal, a server, etc.) capable of performing communication. This may be referred to as Vehicle to everything (V2X) communication. The V2X communication may be defined as technology of exchanging or sharing information, such as traffic condition and the like, while performing communication with a road infrastructure and other vehicles during driving.

V2V communication may be understood as an example of V2X communication or as a concept included in V2X communication.

The processor 870 may perform V2V communication or V2X communication with a nearby vehicle (another vehicle) through the communication unit 810.

Here, the nearby vehicle may denote at least one of a vehicle existing within a predetermined distance from the vehicle 100 and a vehicle entering within a predetermined distance based on the vehicle 100.

The present disclosure may not be limited thereto, and the nearby vehicle may include all vehicles capable of performing communication with the communication unit 810 of the vehicle 100. According to this specification, for the sake of explanation, an example will be described in which the nearby vehicle is a vehicle existing within a predetermined distance based on the vehicle 100 or a vehicle entering within a predetermined distance based on the vehicle 100.

The predetermined distance may be determined based on a distance capable of performing communication through the communication unit 810, determined according to a specification of a product, or determined/varied based on a user's setting or V2X communication standard.

Specifically, the V2X module 820 may be configured to receive LDM data from another vehicle. The LDM data may be a V2X message (BSM, CAM, DENM, etc.) transmitted and received between vehicles through V2X communication.

The LDM data may include the location information of another vehicle.

The processor 870 may determine a relative location between the vehicle of the present disclosure and another vehicle based on the location information of the vehicle acquired through the communication unit 810 and the location information of the another vehicle included in the LDM data received through the V2X module 820.

In addition, the LDM data may include speed information of another vehicle. The processor 870 may also determine a relative speed of the another vehicle using speed information of the vehicle of the present disclosure and the speed information of the another vehicle. The speed information of the vehicle may be calculated using a degree to which the location information of the vehicle received through the communication unit 810 changes over time or calculated based on information received from the driving operation device 500 or the power train driving unit 610 of the vehicle 100.

The V2X module 820 may be the V2X communication unit 430 described above.

Meanwhile, the communication unit 810 of the present disclosure may include an eHorizon module 830.

The eHorizon module 830 may perform wireless communication with an external server (eHorizon). The eHorizon module 830 may receive an ADAS MAP from the external server.

The ADAS MAP may include map information. In the map information included in the ADAS MAP, information associated with a road (event information) may be divided into lane units.

The processor 870 of the vehicle control device 800 associated with the present disclosure may determine an absolute coordinate of the information (event information) associated with a road based on the ADAS MAP received from the external server (eHorizon) through the eHorizon module 830. In addition, the processor 870 may autonomously drive the vehicle or perform a vehicle control using the absolute coordinate of the information (event information) associated with the road.

FIG. 10A illustrates an example of a data format of LDM data (or LDM) transmitted and received between vehicles via V2X communication, and FIG. 10B illustrates an example of a data format of an ADAS MAP received from an external server (eHorizon).

Referring to FIG. 10A, the LDM data (or LDM) 1050 may be formed to have four layers.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (for example, specific place information specified by a maker among a plurality of place information included in the map information) among information associated with road. The landmark information may include location information, name information, size information, and the like.

The third layer 1056 may include traffic situation related information (for example, traffic light information, construction information, accident information, etc.) among the road-related information. The construction information and the accident information may include location information.

The fourth layer 1058 may include dynamic information (for example, object information, pedestrian information, other vehicle information, etc.) among the road-related information. The object information, pedestrian information, and other vehicle information may include location information.

In other words, the LDM data 1050 may include information sensed through a sensing unit of another vehicle or information sensed through a sensing unit of the vehicle of the present disclosure, and may include road-related information that is transformed in real time as it goes from the first layer to the fourth layer.

Referring to FIG. 10B, the ADAS MAP may be formed to have four layers similar to the LDM data.

The ADAS MAP 1060 may denote data received from eHorizon and formed to conform to the ADASIS standard.

The ADAS MAP 1060 may include a first layer 1062 to a fourth layer 1068.

The first layer 1062 may include topology information. The topology information is, for example, information that explicitly defines a spatial relationship, and may refer to map information.

The second layer 1064 may include landmark information (for example, specific place information specified by a maker among a plurality of place information included in the map information) among information associated with the road. The landmark information may include location information, name information, size information, and the like.

The third layer 1066 may include highly detailed map information. The highly detailed MAP information may be referred to as an HD-MAP, and road-related information (for example, traffic light information, construction information, accident information) may be recorded in the lane unit. The construction information and the accident information may include location information.

The fourth layer 1068 may include dynamic information (for example, object information, pedestrian information, other vehicle information, etc.). The object information, pedestrian information, and other vehicle information may include location information.

In other words, the ADAS MAP 1060 may include road-related information that is transformed in real time as it goes from the first layer to the fourth layer, similarly to the LDM data 1050.

In addition, the map providing device 800 related to the present disclosure may include a sensing unit 840.

The sensing unit 840 may be the object detecting apparatus 300 described with reference to FIG. 7 or the sensing unit 120 provided in the vehicle 100.

In addition, the sensing unit 840 may be a sensing unit independent of the object detecting apparatus 300 provided in the vehicle or the sensing unit 120 provided in the vehicle 100. The sensing unit 840 may include the characteristics of the sensing unit 120 or the object detecting apparatus 300 described in FIG. 7 even when the sensing unit 840 is an independent sensing unit.

The sensing unit 840 may include the camera 310 described with reference to FIG. 7.

The sensing unit 840 may also be implemented in combination of at least two of the camera 310, the radar 320, the LiDAR 330, the ultrasonic sensor 340 and the infrared sensor 350 provided in the object detecting apparatus 300, and the sensing unit 120.

The sensing unit 840 may sense an object existing in the vicinity of the vehicle 100 and sense information related to the object.

For example, the object may include other vehicles, people, objects, terrains, and the like which exist near the vehicle 100.

The sensing unit 840 may sense information related to the vehicle 100 of the present disclosure.

The information related to the vehicle may be at least one of vehicle information (or a driving status of the vehicle) and the surrounding information related to the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, information associated with the user (for example, whether or not the user is an authenticated user), and the like.

The surrounding information of the vehicle may be a state of road surface on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition, the surrounding information may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of explanation, one example in which the sensing unit 840 is provided separately in the map providing device 800 will be described. Allowing the processor 870 to acquire any information through the sensing unit 840 may be understood as allowing the processor 870 to acquire any information using at least one of the object detecting apparatus 300 and the sensing unit 120 provided in the vehicle 100.

The map providing device 800 of the present disclosure may include a processor 870 capable of controlling a communication unit 810, a V2X module 820, an eHorizon module 830, a sensing unit 840, and the like.

The processor 870 may be the controller 170 described in FIG. 7.

The processor 870 may control the components described in FIG. 7 and the components described in FIG. 8.

The processor 870 may autonomously drive the vehicle 100.

For example, the processor 870 may autonomously drive the vehicle 100 based on information sensed through the sensing unit 840 and information received through the communication unit 810.

The technology for autonomously driving a vehicle is a general technology, and thus more detailed description thereof will be omitted Specifically, the processor 870 may control the communication unit 810 to acquire the location information of the vehicle. For example, the processor 870 may acquire the location information (location coordinates) of the vehicle 100 through the location information unit 420 of the communication unit 810.

Furthermore, the processor 870 may control the eHorizon module 830 of the communication unit 810 to receive map information from an external server. Here, the eHorizon module 830 may receive an ADAS MAP from the external server (eHorizon). The map information may be included in the ADAS MAP.

In addition, the processor 870 may control the V2X module 820 of the communication unit 810 to receive location information of another vehicle from the another vehicle. Here, the V2X module 820 may receive LDM data from another vehicle. The location information of the another vehicle may be included in the LDM data.

The another vehicle denotes a vehicle existing within a predetermined distance from the vehicle, and the predetermined distance may be a communication-available distance of the communication unit 810 or a distance set by a user.

The processor 870 may control the communication unit to receive map information from an external server and the location information of the another vehicle from the another vehicle.

Furthermore, the processor 870 may merge the acquired location information of the vehicle and the received location information of the another vehicle into the received map information, and control the vehicle 100 based on at least one of the merged map information and the information associated with the vehicle sensed through the sensing unit 840.

Here, the map information received from the external server may denote highly detailed map information (HD-MAP) included in the ADAS MAP. The highly detailed map information may be recorded with road-related information in the lane unit.

The processor 870 may merge the location information of the vehicle 100 and the location information of another vehicle into the map information in the lane unit. In addition, the processor 870 may merge road-related information received from an external server and road-related information received from another vehicle into the map information in the lane unit.

The processor 870 may generate an ADAS MAP required for the control of the vehicle using an ADAS MAP received from an external server and information associated with the vehicle received through the sensing unit 840.

Specifically, the processor 870 may apply information associated with the vehicle sensed within a predetermined range through the sensing unit 840 to map information received from the external server.

Here, the predetermined range may be an available distance allowing the sensing unit 840 to sense information or may be a distance set by a user.

The processor 870 may apply information associated with a vehicle sensed within a predetermined range through the sensing unit to the map information and then additionally merge the location information of another vehicle thereto to control the vehicle.

In other words, when information associated with a vehicle sensed within a predetermined range through the sensing unit is applied to map information, the processor 870 may use only the information within the predetermined range from the vehicle, and thus a range capable of controlling the vehicle may be local.

However, the location information of another vehicle received through the V2X module may be received from the another vehicle existing in a space out of the predetermined range. It may be because the communication-available distance of the V2X module communicating with the another vehicle through the V2X module is farther than a predetermined range of the sensing unit 840.

As a result, the processor 870 may merge the location information of another vehicle included in LDM data received through the V2X module 820 into map information that has sensed information associated with the vehicle to acquire the location information of the vehicle existing in a broader range, thereby more effectively controlling the vehicle.

For example, it is assumed that a plurality of other vehicles are crowded ahead in a lane in which the vehicle exists, and it is assumed that the sensing unit is able to sense only the location information of an immediately preceding vehicle.

In this case, when only information associated with a vehicle sensed within a predetermined range on map information is used, the processor 870 may generate a control command for controlling the vehicle such that the vehicle overtakes the preceding vehicle.

However, in reality, a plurality of other vehicles are crowded ahead, and the vehicle may be in a situation where it is not easy to pass and cut in.

At this time, the present disclosure may acquire the location information of another vehicle received through the V2X module. At this time, the received location information of the another vehicle may include location information of not only a vehicle immediately in front of the vehicle 100 but also a plurality of other vehicles in front of the preceding vehicle.

The processor 870 may additionally merge the location information of the plurality of other vehicles acquired through the V2X module to map information to which information associated with the vehicle is applied, to determine that it is in an inappropriate situation to pass and cut in the preceding vehicle.

Through the foregoing configuration, the present disclosure may overcome the conventional technical limitations in which only information associated with the vehicle acquired through the sensing unit 840 is merely merged to highly detailed map information to allow autonomous driving only within a predetermined range. In other words, according to the present disclosure, not only information associated with a vehicle sensed through the sensing unit but also information (a speed of another vehicle, a location of another vehicle) associated with another vehicle received from the another vehicle at a greater distance than the predetermined range through the V2X module may additionally be used, thereby more accurately and stably performing the vehicle control.

Vehicle control described in this specification may include at least one of autonomously driving the vehicle 100 and outputting a warning message associated with the driving of the vehicle.

Hereinafter, a method of allowing the processor to control a vehicle using LDM data received through the V2X module, an ADAS MAP received from the external server (eHorizon), and information associated with the vehicle sensed through the sensing unit provided in the vehicle will be described in detail with reference to the accompanying drawings.

Figure 11A:
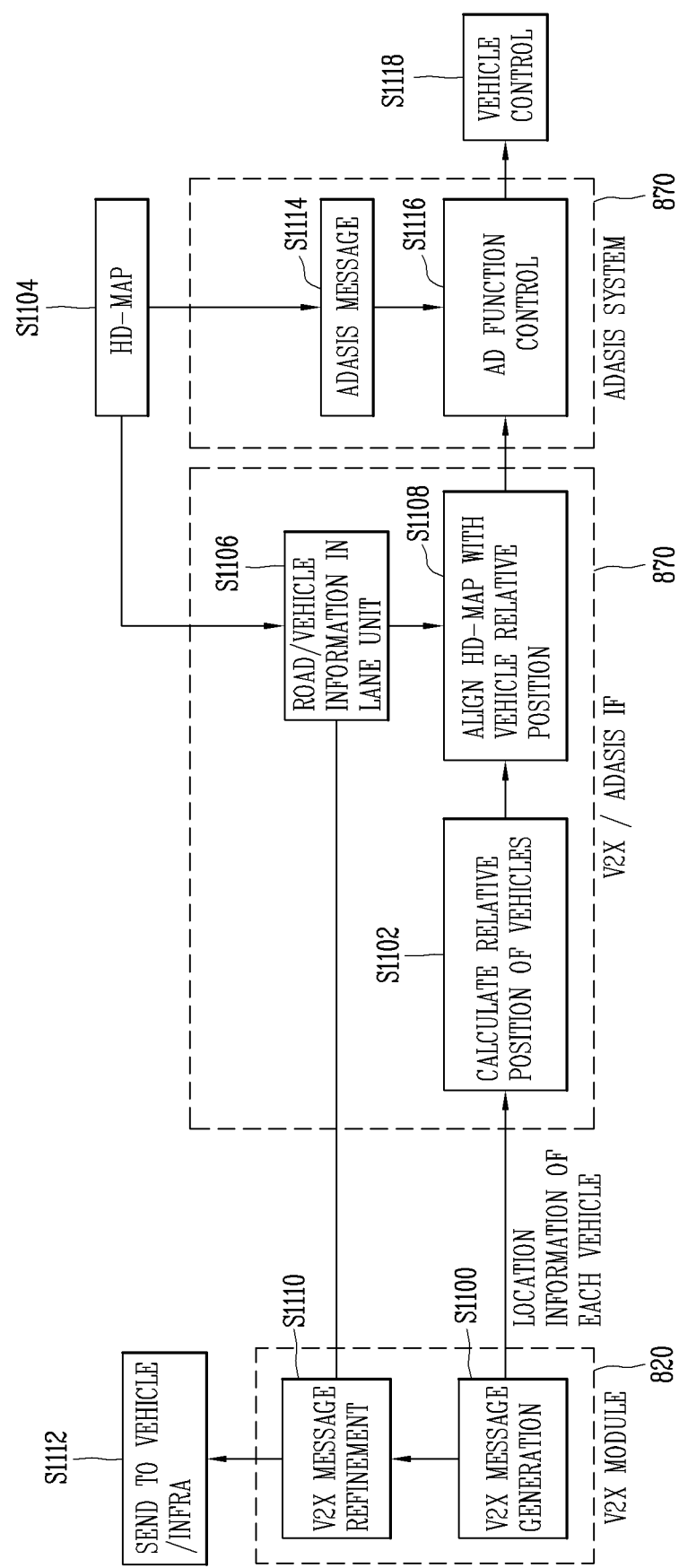
FIGS. 11A and 11B are conceptual views illustrating a method of controlling a vehicle using an LDM and an ADAS MAP according to the present disclosure.
Figure 11B:
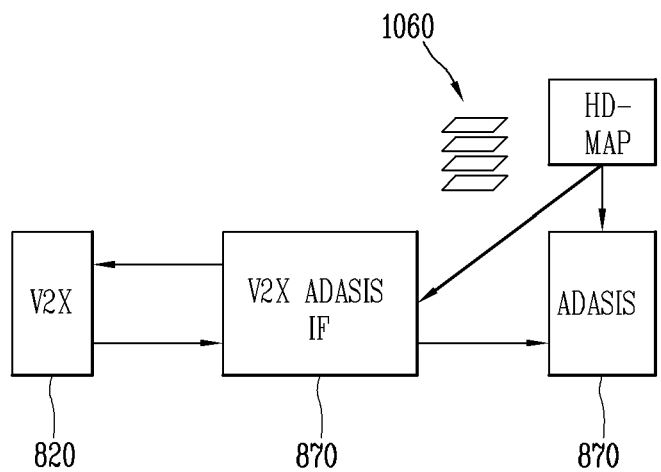
Figure 11B:
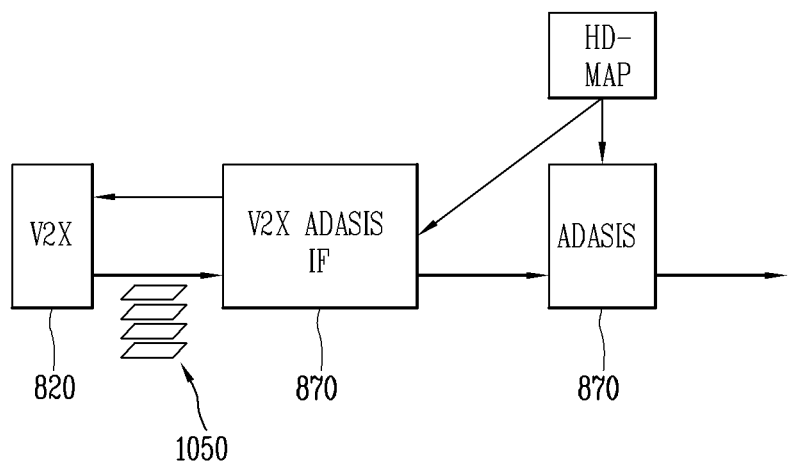

FIGS. 11A and 11B are conceptual views illustrating a method of controlling a vehicle using an LDM and an ADAS MAP according to the present disclosure.

First, referring to FIG. 11A, the processor 870 included in the map providing device 800 of the present disclosure may include a V2X/ADASIS IF (InterFace) and an ADASIS system. The V2X/ADASIS IF and ADASIS system may be in a hardware configuration or in the form of a distinctive component according to the function in terms of software.

The V2X module 820 of the communication unit 810 may generate a V2X message (S1100). Here, the V2X message may include LDM data.

For an example, the V2X module 820 may generate the V2X message based on the receipt of a V2X message transmission request from an infrastructure installed in another vehicle or on a road.

For another example, the V2X module 820 may generate the V2X message to request the location information of another vehicle to the another vehicle. Here, the processor 870 may transmit the V2X message to the another vehicle, and receive the location information of another vehicle from the another vehicle.

At this time, the another vehicle to which the V2X message is transmitted may be another vehicle existing within a predetermined distance from the vehicle 100. The predetermined distance may be determined by an available distance of the V2X module or the setting of a user. When a number of other vehicles to which the V2X message is transmitted is plural, the processor 870 may acquire location information of the another vehicle from at least one of the plurality of other vehicles through the V2X module 820.

Then, the processor 870 (V2X/ADASIS IF) may calculate a relative location (relative distance) between the vehicle and the another vehicle based on the received location information of the another vehicle (S1104).

In addition, the processor 870 may receive an ADAS MAP from the external server (eHorizon) through the eHorizon module 830 (S1104). The ADAS MAP may include a detailed map capable of receiving map information, namely, road-related information in the lane unit.

The processor 870 may determine information (vehicle information) associated with roads in the lane unit from the received map information (S1106).

Then, the processor 870 may align a relative location between the vehicle and the another vehicle to the received map information (S1108).

In other words, the processor 870 may extract a relative location between the vehicle and another vehicle that has transmitted LDM data based on the LDM data received through the V2X module 820, and align the extracted relative location of the another vehicle to an ADAS MAP (map information) received through the eHorizon module 830.

In other words, the present disclosure may align a relative location between the vehicle and the another vehicle extracted through V2X communication to a detailed map (ADAS MAP received from the external server (eHorizon)) capable of merging information in the lane unit, to generate a merged map capable of determining a real-time relative location between the vehicle and the another vehicle in the lane unit.

The V2X module 820 may redefine a V2X message using the ADAS MAP in which the relative location between the vehicle and the another vehicle is aligned in the lane unit (S1110). Then, the processor 870 may transmit the redefined V2X message to the another vehicle or infrastructure.

In addition, the processor 870 may generate an ADASIS standard message using the ADAS MAP received from the external server (eHorizon) (S1114). The message may be a message used for autonomous driving of the vehicle. For example, the message may include a warning message generated during autonomous driving, a notification message for notifying information associated with roads such as accident information/construction information, and the like.

The processor 870 may transmit an ADAS MAP (map information, highly detailed MAP), in which a relative location between the vehicle and the another vehicle is aligned in the lane unit, to an ADASIS system (S1108). Then, the processor 870 may perform an AD function (autonomous driving) using the ADASIS standard message and the ADAS MAP (map information, highly detailed MAP) in which the relative location between the vehicle and the another vehicle is aligned in the lane unit (S1118).

With this configuration, the processor 870 of the present disclosure can control the vehicle using the ADAS MAP (map information, highly detailed MAP) in which the relative location between the vehicle and the another vehicle is aligned in the lane unit (S1118).

In other words, the present disclosure may calculate a relative location (network) between the vehicle and the another vehicle using the location information of the another vehicle received from the another vehicle through V2X communication. Then, the calculated relative location information may be aligned in the lane unit on the highly detailed MAP received from the external server (eHorizon).

The ADASIS system may enhance accuracy of autonomous driving (AD) functions using the ADAS MAP in which the relative location between the vehicle and the another vehicle is aligned in the lane unit, so as to use the same for an autonomous driving control.

In addition, the V2X module may enhance accuracy of outputting a warning message associated with driving of the vehicle using a highly detailed MAP capable of recording road-related information in the lane unit.

Meanwhile, the LDM data and the ADAS MAP of the present disclosure may use different coordinates. In this case, as illustrated in FIG. 11B, the processor 870 may convert a coordinate system of an ADAS MAP 1060 received via the eHorizon module 830 into a coordinate system of LDM data received via the V2X module 820 or convert the coordinate system of the LDM data 1050 into a coordinate system of the ADAS MAP.

The types of coordinate systems may include various types of coordinate systems such as a longitude/latitude coordinate system, a Cartesian coordinate system, a polar coordinate system, and the like, and the processor 870 may perform coordinate system conversion such that the coordinate system of the LDM data received through the V2X module corresponds to the coordinate system of the ADAS MAP received through the eHorizon module.

Through this, the processor 870 of the present disclosure may merge (align) the location information of the another vehicle included in the LDM data to the ADAS MAP in the lane unit.

Figure 12:
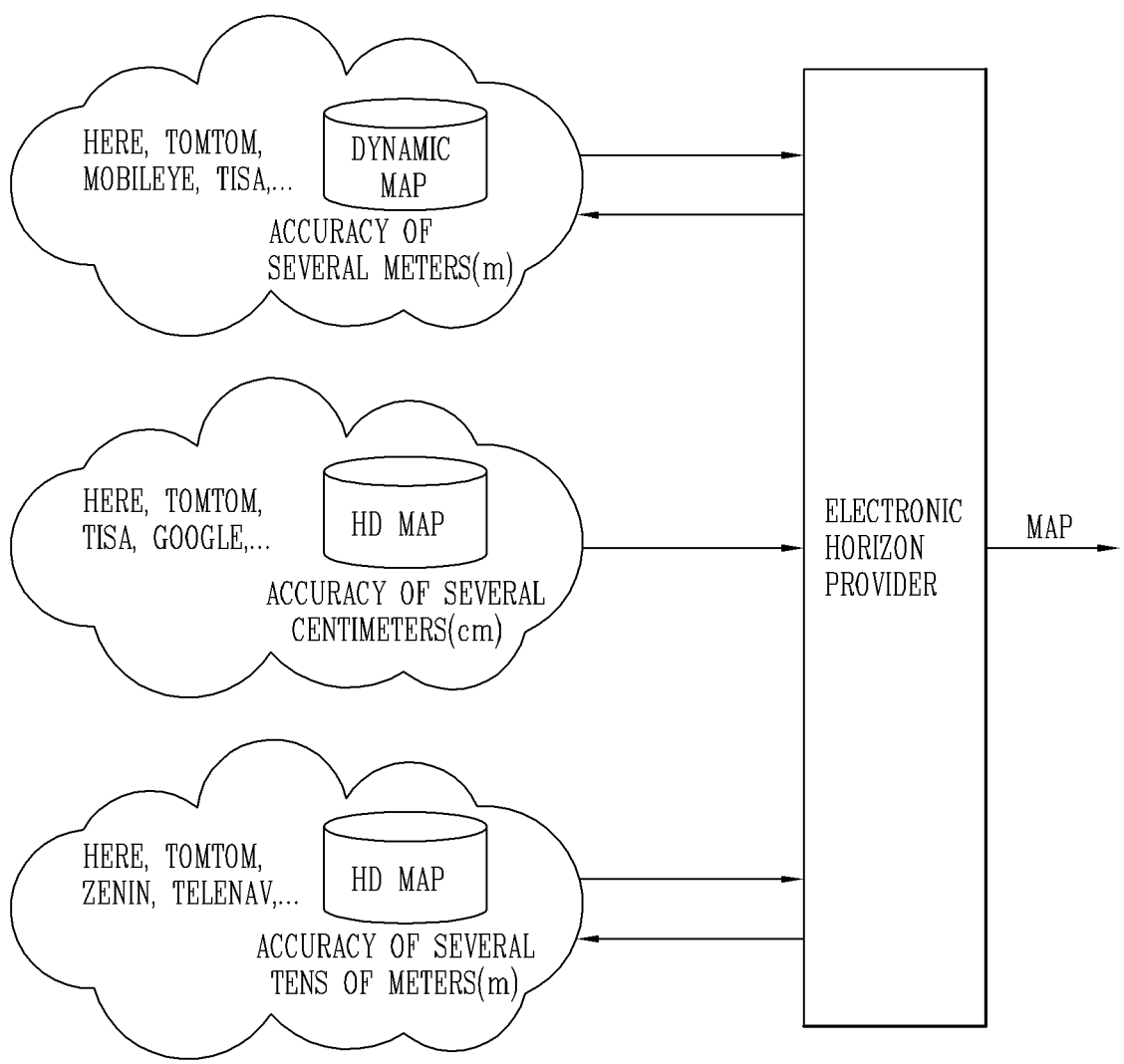
FIG. 12 is a conceptual view illustrating a map received from a map providing device.
Figure 13A:
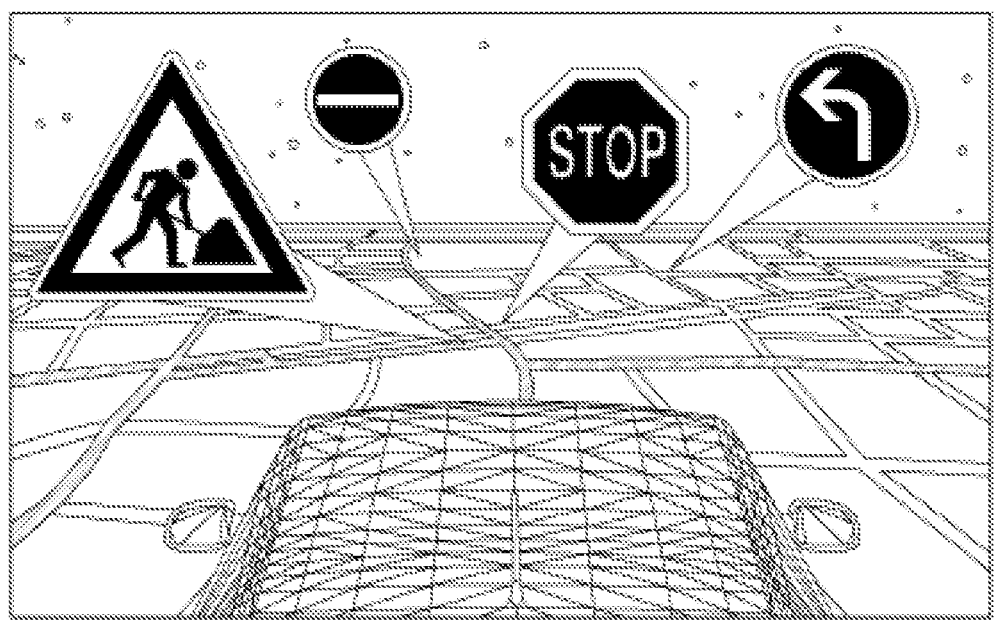
FIGS. 13A, 13B, and 13C are conceptual views illustrating the map illustrated in FIG. 12 in more detail.
Figure 13B:
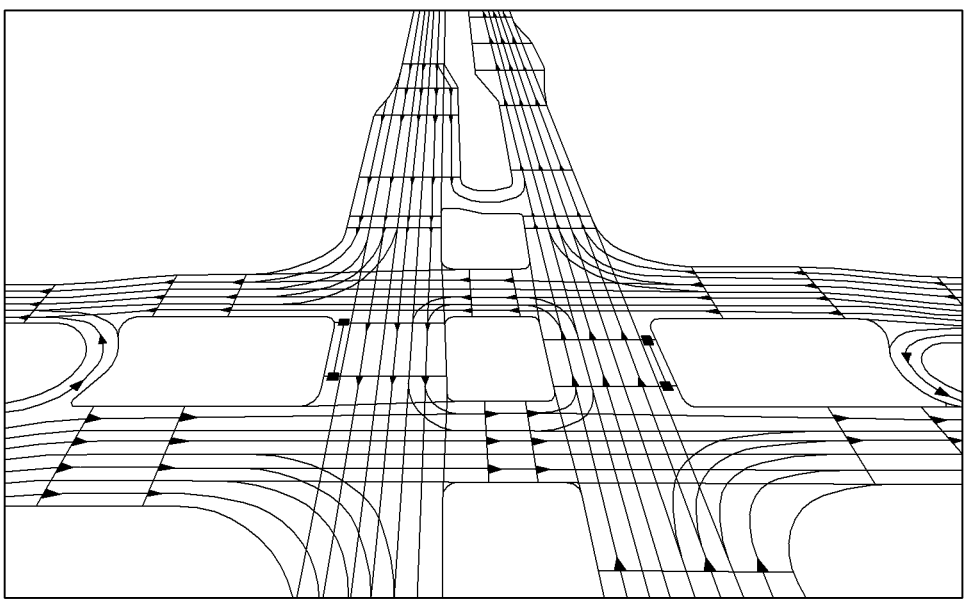
Figure 13C:
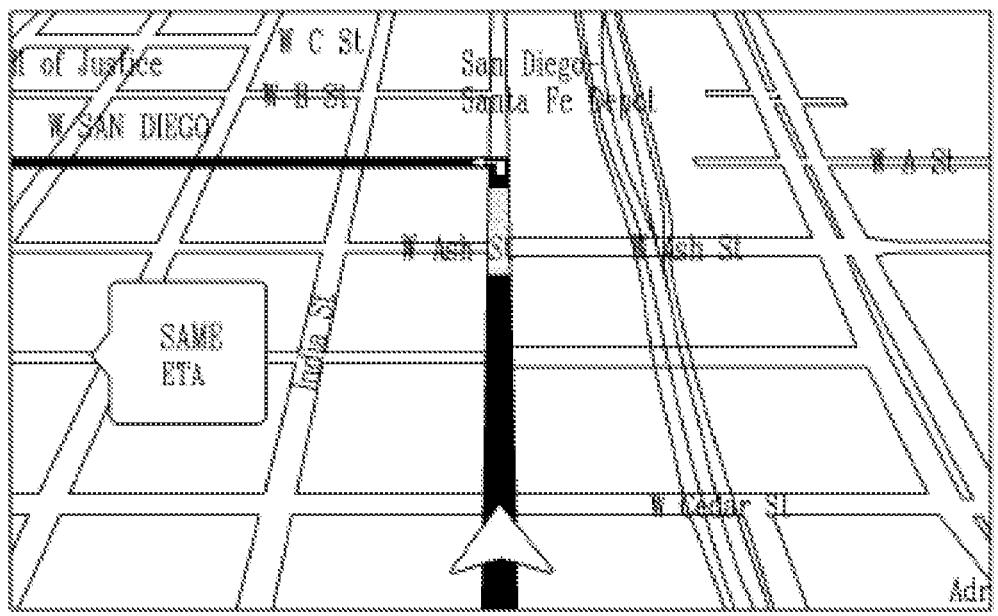

FIG. 12 is a conceptual view illustrating a map received by the map providing device, and FIGS. 13A, 13B and 13C are conceptual views illustrating in more detail the map illustrated in FIG. 12.

The eHorizon system includes a server (or backend) and a vehicle.

The server provides a map to the vehicle, and the vehicle controls various devices provided in the vehicle using the map.

The map providing device 800 receives one or more maps from the server using a memory (or Horizon Cache), and provides the received maps to electric components.

The map providing device 800 merges a plurality of maps received from a plurality of servers into one map (or eHorizon), and provides the merged map to the electric components.

For example, the map providing device 800 may receive a first map having accuracy of several meters from a first server. As illustrated in FIG. 13A, the first map may be referred to as 'dynamic map' in that it includes a plurality of dynamic objects sensed by at least one electric component.

Here, the dynamic object refers to an object which is sensed by electric components such as a camera, a LiDAR, a radar, etc., disposed in the vehicle. For example, a sign, a traffic light, a vehicle involved with an accident, and the like may be set as dynamic objects. The dynamic object includes at least one of an identification number of an object, a kind of an object, a size of an object, a shape of an object, and location information (e.g., latitude, longitude, altitude) of an object.

The map providing device 800 may receive a second map with accuracy of several centimeters (cm) from a second server. As illustrated in FIG. 13B, the second map may be referred to as 'highly detailed (HD) map' in that it has specific information in a lane unit included in a road.

The map providing device 800 may receive a third map having accuracy of several tens of meters (m) from a third server. The third map is provided with nodes and lines connecting the nodes. As illustrated in FIG. 13C, the third map may be referred to as 'standard detailed (SD) map' having a level lower than the second map, in that it has specific information in a road unit, which is a higher concept than the lane unit.

The map providing device 800 may be referred to as 'electronic horizon (or eHorizon) provider' or may be referred to as 'EHP'.

Further, the map providing device 800 collects electric component information received from the electric components and performs positioning (or localization) using the collected electric component information.

Positioning refers to specifying a current position of the vehicle using various information. For example, by comparing information included in a map received from a server with electric component information, one matching point of those information may be specified as the current position of the vehicle.

As described above, the map providing device 800 receives a plurality of maps from different servers (or providers), and information provided by each of the plurality of maps is inconsistent. For example, if the first map provides location information (x1, y1, z1) and the second map provides location information (x2, y2, z2) for the same traffic light, which information has to be used is a matter.

In order to solve the problem, it is an object of the present disclosure to provide a map providing device that can match location information while utilizing applications provided by various providers.

Figure 14:
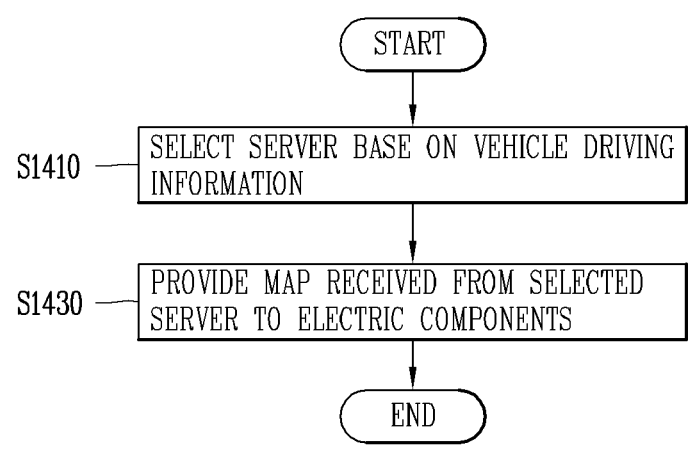
FIG. 14 is a flowchart illustrating an operation of a map providing device in accordance with one embodiment of the present disclosure.

FIG. 14 is a conceptual view illustrating an operation of a map providing device in accordance with one embodiment of the present disclosure.

The present disclosure relates to a map providing device 800 mounted in a vehicle 100 to provide map data to a plurality of electric components disposed in the vehicle 100.

An electric component is defined as any device that is provided in the vehicle 100 to perform communication with the map providing device 800 in a wired or wireless manner, and uses electricity as a power source. For example, each component described in FIG. 7 may correspond to the electric component.

The map providing device 800 includes the communication unit 810 and the processor 870.

The communication unit 810 is configured to perform communication with the various components described in FIG. 7. For example, the communication unit 810 may receive various information provided through a controller area network (CAN). In another example, the communication unit 810 may perform communication with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 810 may perform communication with one or more electric components provided in the vehicle 100. The communication unit 810 may receive information related to the driving of the vehicle from most of devices provided in the vehicle 100.

The communication unit 810 is configured to perform communication with the electric components and receive different maps from a plurality of servers, respectively. The communication unit 810 may perform communication with at least one of the electric components in a wired or wireless manner, and use a controller area network (CAN).

The processor 870 selects a server based on driving information (or traveling information) of the vehicle 100 (S1410). The processor 870 provides the map received from the selected server to the electric components (S1430).

For example, when the vehicle 100 is in a first state, the processor 870 selects the first server and controls the communication unit 810 such that the first map received from the first server is provided to the electric components. On the other hand, when the vehicle 100 is in a second state, the processor 870 selects the second server and controls the communication unit 810 such that the second map received from the second server is provided to the electric components.

For example, the first map may be a standard definition map, and the second map may be a high definition map. In another example, the first map is may be a layer of a first level which is the lowest among a plurality of layers included in one map, and the second map may be a layer of a fourth level which is the highest among the layers.

For example, the first state may be a manual driving state of the vehicle 100, and the second state may be an autonomous driving state of the vehicle 100.

Autonomous driving may be defined as controlling at least one of acceleration, deceleration, and driving direction based on a preset algorithm. In other words, the autonomous driving refers to that a driving control apparatus is automatically manipulated even without a user input applied to the driving control apparatus.

Manual driving may be defined as a non-autonomous driving state. Here, the first state and the second state are different states and may be variously modified or newly defined according to embodiments.

The manual driving state is a state in which a driver is directly involved in driving. Thus, in this state, the minimum information is provided so that computation of the electric components and a battery consumption can be reduced. That is, the standard definition map can be provided to the electric components.

On the other hand, the autonomous driving state is a driving state based on the electric component information provided by the electric components. Thus, in this state, the maximum information is provided so that safe and accurate driving can be performed. That is, the high definition map can be provided to the electric components.

On the other hand, the processor 870 may determine whether or not the state of the vehicle satisfies one of preset conditions, based on the vehicle driving information received through the communication unit 810. The processor 870 may select at least one server corresponding to the satisfied condition among the plurality of servers.

Here, information transmitted from the electric component provided in the vehicle 100 to the map providing device 800 is referred to as 'vehicle driving information'.

Vehicle driving information includes vehicle information and surrounding information related to the vehicle. Information related to the inside of the vehicle based on the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

Surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

On the other hand, the processor 870 may provide the first map to the electric components together with the second map when the vehicle 100 is in the second state. For example, when the second state is the autonomous driving state, various information provided by a plurality of maps may be utilized to allow autonomous traveling to be performed more safely and accurately.

The processor 870 terminates the provision of the second map when the vehicle 100 is switched from the second state to the first state. In other words, in the first state, the second map is restricted from being provided to the electric components.

The map providing device according to the present disclosure provides map data to the electric components provided in the vehicle. At this time, since the map data received from the server is not all transmitted but is selectively provided based on the driving information of the vehicle, the computation that the electric components should perform is reduced.

The processor 870 may provide both the first map and the second map to the electric components in the second state. In this case, there is a problem that the first map and the second map do not match each other, such as the first map and the second map including objects whose location information does not match each other. In order to solve this problem, the processor 870 may match the first map and the second map when the first map and the second map are provided together.

On the other hand, even for a map received from one server, the processor 870 may not provide all the information received from the server to the electric components but select some information based on the electric component information and provide the selected information to the electric components.

For example, the map may include the plurality of layers, described above with reference to FIGS. 10A and 10B. The processor 870 may select one or more layers among the plurality of layers based on the electric component information, and provide the selected layers to the electric components.

In other words, a plurality of maps may be stored in one server, and the processor 870 may selectively download different maps stored in the one server based on the vehicle driving information or download all the maps and selectively provide them to the electric components.

Figure 15:
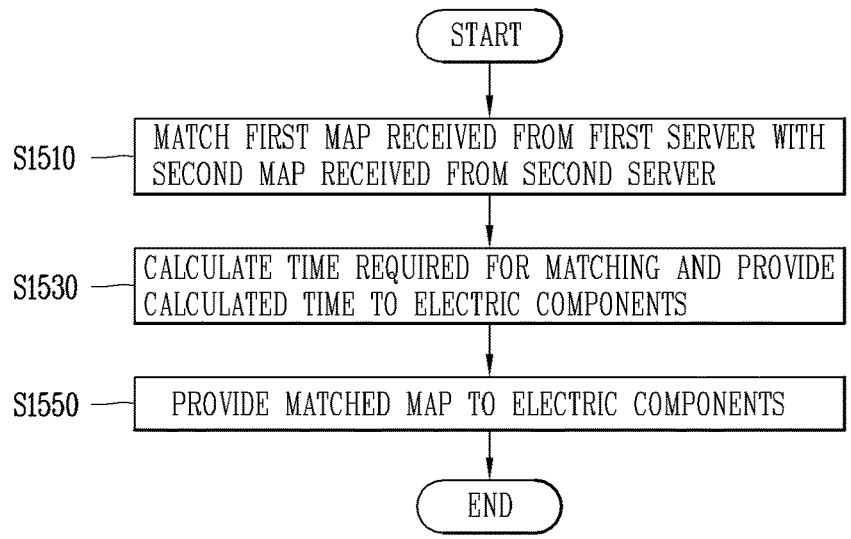
FIG. 15 is a flowchart illustrating one embodiment of matching a plurality of maps.

FIG. 15 is a flowchart illustrating one embodiment of matching a plurality of maps.

The processor 870 matches the first map received from the first server with the second map received from the second map (S1510).

For example, the processor 870 may match reference points or reference axes of the first map and the second map so that the first map and the second map match each other.

In another example, the processor 870 may compare a plurality of objects included in the first map with a plurality of objects included in the second map, and classify the objects into a first group of objects whose location information matches, and a second group of objects whose location information does not match. The processor 870 may generate new location information related to each object based on a preset algorithm so as to allow matching of the objects included in the second group.

The processor 870 may match the first map and the second map in real time based on a location of the vehicle 100. When a destination is set in the vehicle 100, matching may also be executed in advance with respect to all the paths to the destination regardless of the location of the vehicle 100.

Next, the processor 870 calculates a time required for the matching, provides the calculated time to the electric components (S1530), and provides the matched map to the electric components (S1550).

Since the matched map is provided to the electric components, if the matching is not completed, the electric components continuously receive a previously-provided map. For example, when the matched map of the first and second maps need to be provided due to a status change while providing the first map, the processor 870 continuously provides the first map until the matching is completed.

In this case, the electric components that need to utilize the second map should wait for the matched map, and there is possibility of causing an error due to the electric component executing its function using the first map.

In order to restrict the electric components from executing their functions for the time required for the matching, the processor 870 controls the communication unit 810 so that the required time is provided to the electric components.

A driving speed of the vehicle 100 may be adjusted according to the required time. For example, the driving speed may be adjusted to a first speed when the required time is within a first range, while being adjusted to a second time when the required time is within a second range. In another example, when the required time is counted, the vehicle 100 travels at a limited speed. As the required time decreases, the driving speed of the vehicle 100 may gradually increase.

This is to allow the vehicle to run at a safe speed until the matched map is provided, so that the autonomous driving can be executed more safely.

The matched map is stored in a memory (not shown). When the vehicle 100 is visited again, the processor 870 does not perform the matching and utilizes the map stored in the memory.

The processor 870 may update information of each of nodes included in the first map according to nodes included in the second map. This is generally because accuracy of the high definition map is higher than that of the standard definition map.

Figure 16:
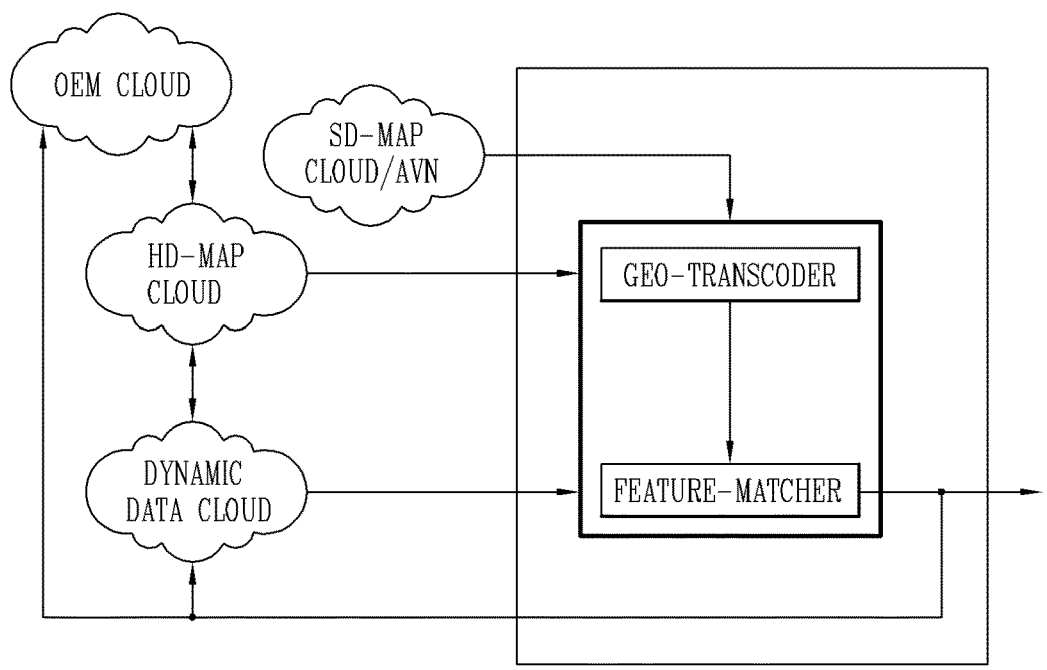
FIG. 16 is a block diagram illustrating in more detail a map providing device according to the present disclosure.

FIG. 16 is a block diagram illustrating in more detail a map providing device according to the present disclosure.

The map providing device 800 according to the present disclosure may further include a geo transcoder and a feature matcher.

The geo transcoder performs a function of matching coordinate information provided by each provider with a traveling direction of the vehicle 100.

The feature matcher performs a function of matching received information with a map when the information in a link-based vector format is received.

The matching between the first map and the second map can be made more efficiently by the geo transcoder and the feature matcher.

Figure 17:
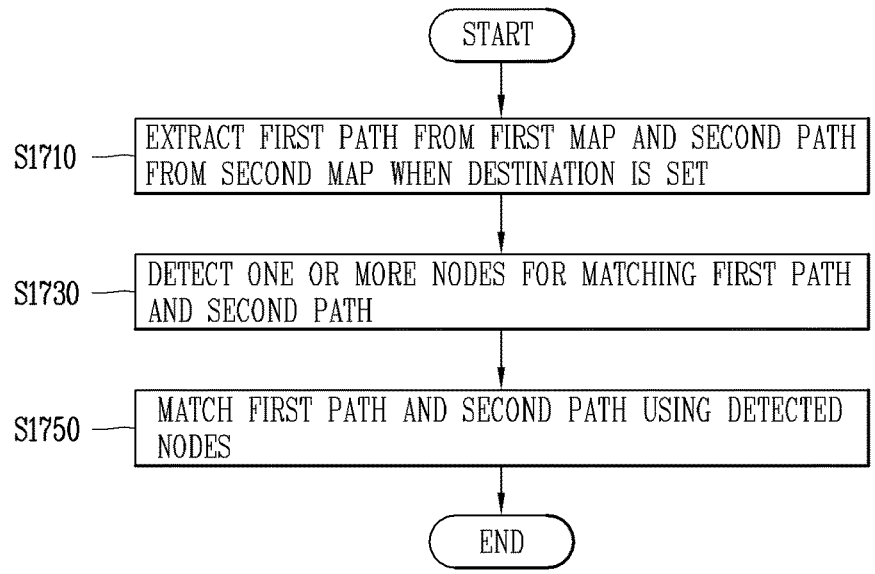
FIG. 17 is a block diagram illustrating in more detail a method of matching a plurality of maps.

FIG. 17 is a block diagram illustrating in more detail a method of matching a plurality of maps.

The processor 870 may receive a first map from a first server and a second map from a second server.

Next, when a destination is set in the vehicle 100, a first path is extracted from the first map and a second path is extracted from the second map (S1710).

The processor 870 extracts a path from a location of the vehicle to the destination from each of the first map and the second map.

The processor 870 searches for one or more nodes to match the first path with the second path (S1730), and matches the first path with the second path using the detected nodes (S1750).

The processor 870 searches for one or more nodes to match the first path with the second path, and controls the memory to store the one or more nodes.

The one or more nodes may include a first node for a first section and a second node for a second section. When the vehicle is located in the first section, the processor 870 may match the first path with the second path using the first node. On the other hand, when the vehicle is located in the second section, the processor 870 may match the first path with the second path using the second node. In other words, the processor 870 may select one or more nodes that are references of matching according to the location of the vehicle, and perform the matching using the selected nodes.

Figure 18:
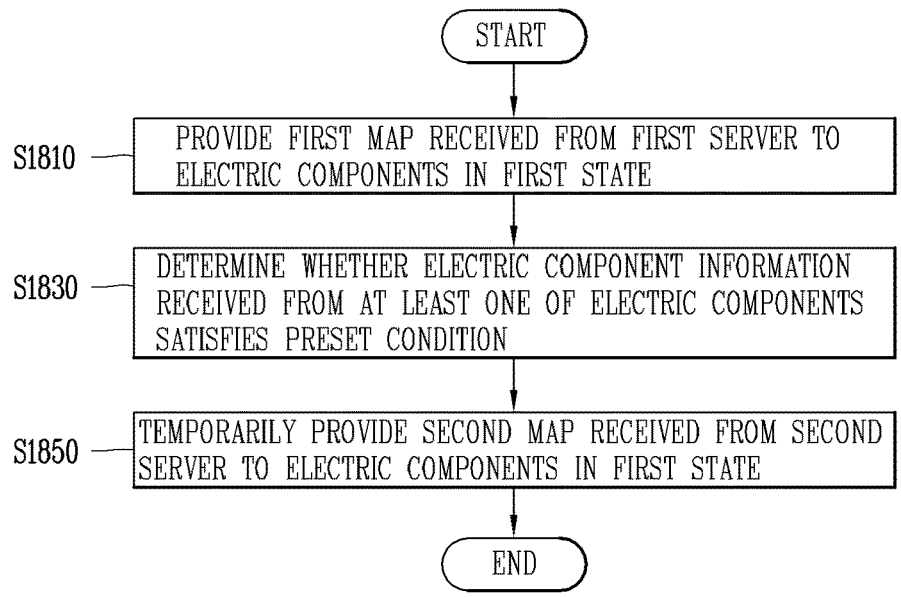
FIG. 18 is a flowchart illustrating a method of temporarily providing a second map in a specific situation while providing a first map.

FIG. 18 is a flowchart illustrating a method of temporarily providing a second map in a specific situation while providing a first map, and FIGS. 19A to 19E are exemplary views illustrating the method of FIG. 18.

The processor 870 provides the first map received from the first server to electric components in the first state (S1810).

At this time, the second map received from the second server is not provided to the electric components.

Next, the processor 870 determines whether electric component information received from at least one of the electric components satisfies a preset condition (S1830), and temporarily provides the second map received from the second server in the first state (S1850).

At this time, the processor 870 may provide the first and second maps together, and match the first and second maps.

When vehicle driving information is changed from a state satisfying the preset condition to a state not satisfying the preset condition, the first map is continuously provided to the electric components but the second map is not provided to the electric components. That is, the second map is temporarily provided to the electric components.

The vehicle driving information is electric component information received from at least one of the electric components, and the processor 870 may determine whether the preset condition is satisfied based on the electric component information.

The case where the driving information satisfies the preset condition in the first state may include at least one of a case where a turn signal is on in the manual driving state, a case where an object whose possibility of collision is higher than a reference value is detected in the manual driving state, a case where a predetermined distance remains until the vehicle enters an intersection in the manual driving state, and a case where the vehicle causes a lane departure in the manual driving state.

Figure 19A:
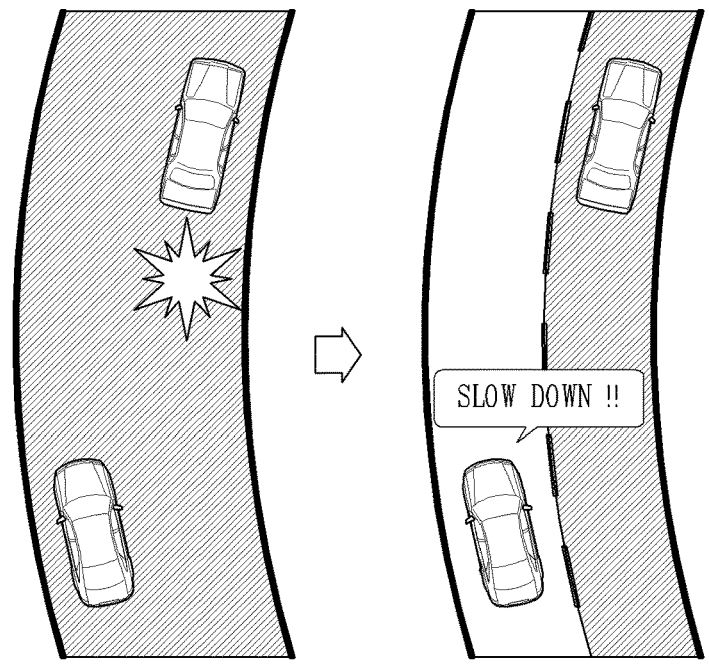
FIGS. 19A to 19E are exemplary views illustrating the method of FIG. 18.

For example, as illustrated in FIG. 19A, the image sensor such as a camera, a LiDAR, and radar may detect a preceding vehicle with possibility of collision higher than a predetermined level. Since the first map does not provide lane-based information, the image sensor outputs a Forward Collision Warning (FCW) based on a distance between the preceding vehicle and the vehicle.

Before the FCW is provided by the image sensor to a passenger, the map providing device 800 temporarily provides the second map to the image sensor. Since the second map provides a map divided in the lane unit, the image sensor re-calculates the collision possibility by considering whether or not the preceding vehicle is located on the same lane as the vehicle based on the second map. The FCW is provided to the passenger when the vehicles are located on the same lane, and is not provided to the passenger when the vehicles are not located on the same lane.

The map providing device 800 terminates the provision of the second map to the electric components when the possibility of collision of the preceding vehicle is lowered to a predetermined level or less.

Since a danger zone in which the FCW is output differs when providing the first map and when providing the second map, the passenger can be provided with more accurate information. Since the second map is provided temporarily, there is an effect that the computation of the electric components can be reduced.

Figure 19B:
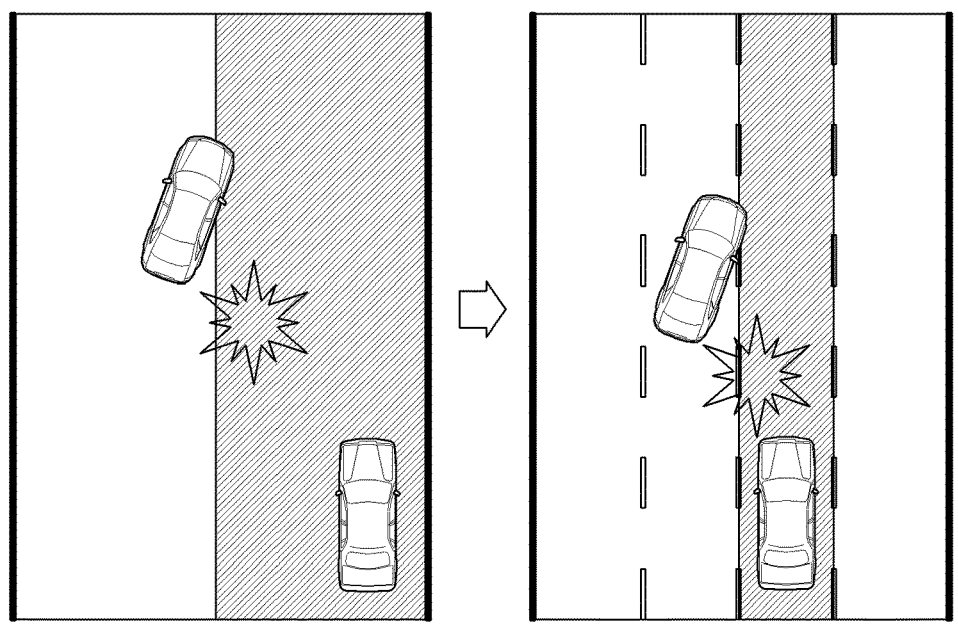

As illustrated in FIG. 19B, a lane change warning (LCW) may be output when the preceding vehicle changes the lane. A danger zone in which the LCW differs when providing the first map and when providing the second map. When the location of the preceding vehicle is specified in the lane unit during the lane change of the preceding vehicle, accuracy of the LCW is improved. Therefore, before the LCW is output to the passenger, the map providing device 800 may temporarily provide the second map to the electric components.

Figure 19C:
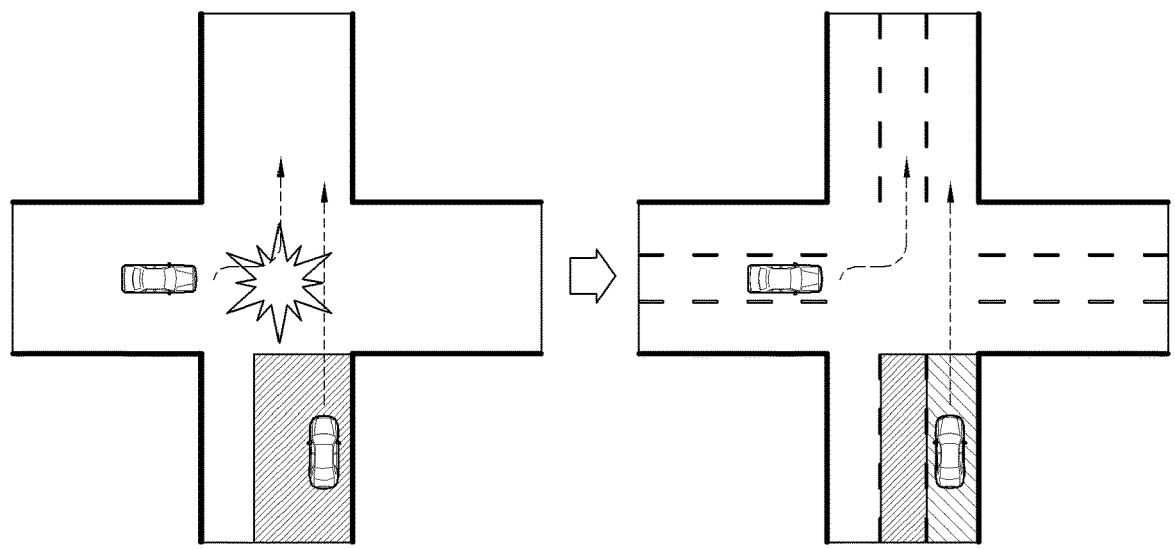

As illustrated in FIG. 19C, a turn assist warning (TAW) may be output at an intersection. When the vehicle 100 enters the intersection, the map providing device 800 may temporarily provide the second map and improve the accuracy of the TAW.

Figure 19D:
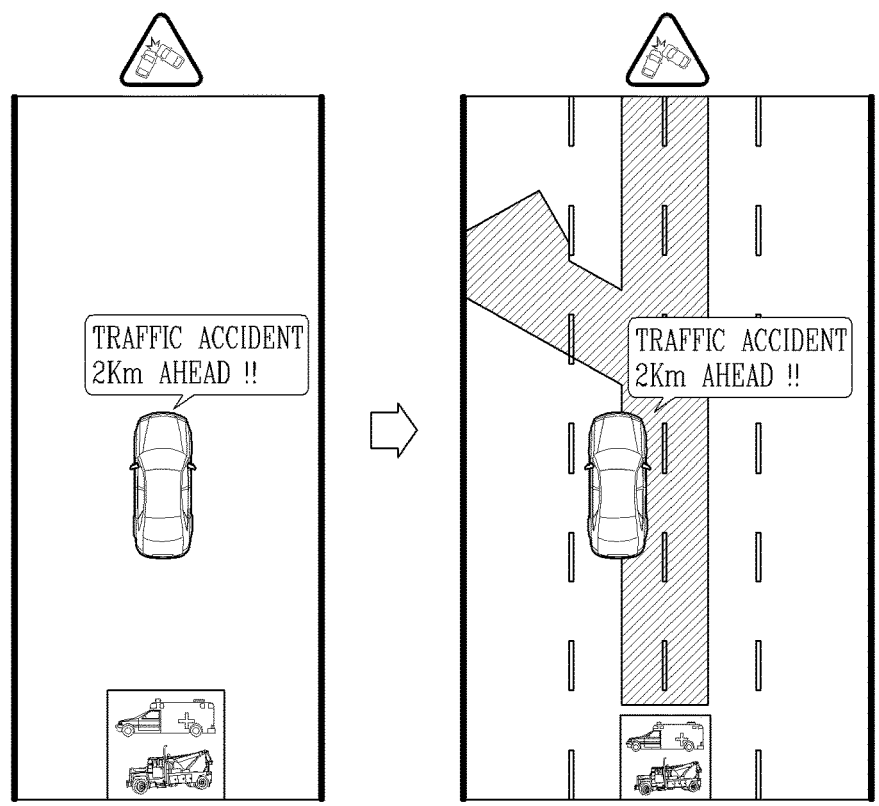
Figure 19E:
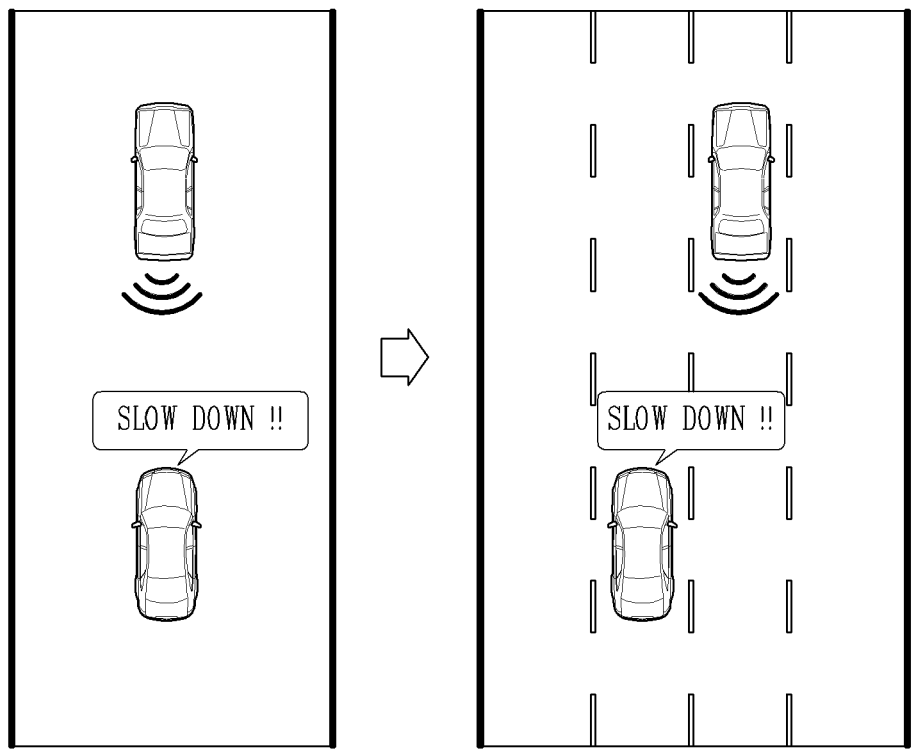

Before outputting Emergency Vehicle Approach (EVA) as illustrated in FIG. 19D or Emergency Electronic Brake Light (EEBL) as illustrated in FIG. 19E, the processor 870 may temporarily provide the second map, so as to improve the accuracy of the warning.

The processor 870 may receive different maps or receive different layers even for the same map according to various conditions.

Here, the conditions are related to vehicle driving information, that is, electric component information received from at least one of the electric components provided in the vehicle 100. The processor 870 may determine whether the electric component information satisfies one of the preset conditions and receive different layers or different maps according to the determination result.

For example, information received from a server may vary depending on a current location of the vehicle. When the vehicle is traveling on an expressway in a section without a lamp to which another vehicle is to enter, a map (or a layer) having a small amount of information is received to reduce the computation. On the other hand, if the vehicle is traveling in a section with a lamp to which the another vehicle is to enter, a map (or a layer) having a large amount of information may be received in order to secure safety of the vehicle.

For the same reason, in a section, such as a curved section in which it is necessary to secure the safety of the vehicle, a different map or layer may be selected in consideration of a road shape and the like.

The processor 870 may also receive an additional map (or layer) necessary for sensing an object if the object is located within a predetermined range based on the vehicle.

The processor 870 may select a different map or layer in consideration of speed of the vehicle, communication sensitivity of the communication unit 810, a traffic volume within a predetermined range based on the location of the vehicle, and the like.

Upon receiving a request message requesting for a specific map from at least one of the electric components while providing the first map received from the first server, the processor 870 may provide the second map received from the second server to the electric components in response to the request message. According to the request message, a type of map provided to the electric components may be changed.

On the other hand, the second map may include a plurality of layers. The processor 870 may select one or more layers among the plurality of layers included in the second map based on vehicle driving information, and provide the one or more layers to the electric components. In this case, the non-selected layers are not provided to the electric components.

The second map may include a plurality of dynamic objects to be sensed by at least one electric component. The processor 870 may select one or more dynamic objects from the plurality of dynamic objects included in the second map based on vehicle driving information, and provide the one or more dynamic objects to the electric components. In this case, the non-selected dynamic objects are not provided to the electric components.

As described above, the processor 870 of the map providing device 800 can select information to be transmitted based on vehicle driving information to provide the selected information, other than providing a map received from a server as it is, thereby reducing computation of electric components.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A map providing device for transmitting map data to electric components disposed in a vehicle, the map providing device comprising:
   a communication interface configured to communicate with the electric components and receive a plurality of maps from a plurality of servers; and
   a processor configured to:
      select, from among the plurality of maps, one or more maps based on driving information of the vehicle; and
      control the communication interface to transmit the map data to the electric components, the map data including information of the selected one or more maps,
   wherein the plurality of servers including a first server and a second server, and
   wherein the processor is configured to:
      based on the vehicle being in a first state, transmit a first map to the electric components, the first map being received from the first server; and
      based on the vehicle being in a second state, transmit a second map to the electric components, the second map being received from the second server,
      wherein the first map is a standard definition map and the second map is a high definition map.

2. The map providing device of claim 1, wherein the processor is configured to, based on the vehicle being in the second state, transmit the first map and the second map to the electric components.

3. The map providing device of claim 2, wherein the processor is configured to, based on the vehicle being switched from the second state to the first state, terminate the transmission of the second map.

4. The map providing device of claim 2, wherein the processor is configured to, based on the vehicle being switched from the first state to the second state, match first reference points or first reference axes of the first map with second reference points or second reference axes of the second map to align the first map with the second map.

5. The map providing device of claim 4, wherein the processor is configured to align the first map with the second map in real time based on a location of the vehicle.

6. The map providing device of claim 4, wherein the processor is configured to calculate a time required for aligning the first map with the second map, and control the communication interface to transmit the required time to the electric components.

7. The map providing device of claim 6, wherein the processor is configured to adjust a driving speed of the vehicle according to the required time.

8. The map providing device of claim 1, wherein the processor is configured to, based on the driving information satisfying a preset condition in the first state, temporarily transmit the first map and the second map to the electric components.

9. The map providing device of claim 8, wherein the processor is configured to, based on the driving information failing to satisfy the preset condition, continuously transmit the first map to the electric components and cease transmission of the second map to the electric components.

10. The map providing device of claim 8, wherein the first state is a manual driving state of the vehicle and the second state is an autonomous driving state of the vehicle.

11. The map providing device of claim 10, wherein the driving information is electric component information received from at least one of the electric components, and
   wherein the processor is configured to determine whether the preset condition is satisfied based on the electric component information.

12. The map providing device of claim 10, wherein the driving information satisfies the preset condition in the first state based on at least one of a determination that, in the manual driving state, a turn signal is turned on, a detection, in the manual driving state, of an object with a potential for collision that is higher than a reference value, a determination that, in the manual driving state, a predetermined distance remains until the vehicle enters an intersection, or a determination that, in the manual driving state, the vehicle intrudes into a lane departure.

13. The map providing device of claim 8, wherein the second map includes a plurality of layers,
   wherein the processor is configured to, based on the driving information, select, from among the plurality of layers, one or more layers included in the second map, and transmit the one or more layers to the electric components, and wherein the processor is configured to withhold transmission of one or more unselected layers among the plurality of layers to the electric components.

14. The map providing device of claim 8, wherein the second map includes a plurality of dynamic objects detectable by at least one of the electric components, wherein the processor is configured to, based on the driving information, select, from among the plurality of dynamic objects included in the second map, one or more dynamic objects, and transmit the selected one or more dynamic objects to the electric components, and wherein the processor is configured to withhold transmission of one or more unselected dynamic objects among the plurality of dynamic objects to the electric components.

15. The map providing device of claim 1, wherein the plurality of servers include a first server and a second server; and wherein the processor is configured to:
transmit a first map to at least one of the electric components, the first map received from the first server;
based on transmitting the first map to the at least one of the electric components, receive, from the at least one of the electric components, a request message that requests a specific map; and
transmit, in response to the request message, a second map to the electric components, the second map received from the second server.

16. The map providing device of claim 1, wherein the processor is configured to receive a first map from a first server and a second map from a second server, and wherein the processor is configured to, based on a destination being input to the vehicle:
determine, from the first map, a first path from a location of the vehicle to the destination;
determine, from the second map, a second path from the location of the vehicle to the destination; and
match the first path with the second path.

17. The map providing device of claim 16, further comprising a memory, wherein the processor is configured to identify one or more nodes for matching the first path with the second path, and store the one or more nodes in the memory.

18. The map providing device of claim 17, wherein the one or more nodes include a first node for a first section and a second node for a second section, and wherein the processor is configured to:
based on the vehicle being located in the first section, match the first path with the second path using the first node; and
based on the vehicle being located in the second section, match the first path with the second path using the second node.

19. A map providing device for transmitting map data to electric components disposed in a vehicle, the map providing device comprising:

a communication interface configured to communicate with the electric components and receive a plurality of maps from a plurality of servers; and a processor configured to:
select, from among the plurality of maps, one or more maps based on driving information of the vehicle; and
control the communication interface to transmit the map data to the electric components, the map data including information of the selected one or more maps, wherein the processor is configured to receive a first map from a first server and a second map from a second server, and wherein the processor is configured to, based on a destination being input to the vehicle:
determine, from the first map, a first path from a location of the vehicle to the destination;
determine, from the second map, a second path from the location of the vehicle to the destination; and
match the first path with the second path, wherein the map providing device further comprises further comprising a memory, wherein the processor is configured to identify one or more nodes for matching the first path with the second path, and store the one or more nodes in the memory, wherein the one or more nodes include a first node for a first section and a second node for a second section, and wherein the processor is configured to:
based on the vehicle being located in the first section, match the first path with the second path using the first node; and
based on the vehicle being located in the second section, match the first path with the second path using the second node.

* * * * *